United States Patent
Mizutani et al.

(10) Patent No.: US 8,016,931 B2
(45) Date of Patent: *Sep. 13, 2011

(54) INK SET

(75) Inventors: Akira Mizutani, Matsumoto (JP);
Shuichi Koganehira, Matsumoto (JP);
Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 378 days.

This patent is subject to a terminal disclaimer.

(21) Appl. No.: 12/214,459

(22) Filed: Jun. 19, 2008

(65) Prior Publication Data

US 2009/0030144 A1    Jan. 29, 2009

(30) Foreign Application Priority Data

Jul. 19, 2007   (JP) ................ 2007-188016

(51) Int. Cl.
*C09D 11/02* (2006.01)
(52) U.S. Cl. .......... 106/31.6; 106/31.86; 106/31.89
(58) Field of Classification Search .......... 106/31.27, 106/31.6, 31.86, 31.89
See application file for complete search history.

(56) References Cited

U.S. PATENT DOCUMENTS

| | | | |
|---|---|---|---|
| 5,236,498 A | 8/1993 | Zaloum et al. | |
| 5,811,213 A | 9/1998 | Chiba | |
| 5,846,306 A | 12/1998 | Kubota et al. | |
| 5,958,129 A | 9/1999 | Urban et al. | |
| 6,152,999 A | 11/2000 | Erdtmann et al. | |
| 6,336,721 B1 | 1/2002 | Provost et al. | |
| 6,419,733 B1 | 7/2002 | Sano et al. | |
| 6,562,121 B2 | 5/2003 | Nickel et al. | |
| 6,713,531 B2 | 3/2004 | Iijima | |
| 6,802,893 B1 | 10/2004 | Komatsu et al. | |
| 6,835,242 B2 | 12/2004 | Nickel et al. | |

(Continued)

FOREIGN PATENT DOCUMENTS

CN    1464900 A    12/2003

(Continued)

OTHER PUBLICATIONS

European Search Report dated Sep. 18, 2008.

(Continued)

*Primary Examiner* — Helene Klemanski
(74) *Attorney, Agent, or Firm* — Nutter McClennen & Fish LLP; John J. Penny, Jr.

(57) ABSTRACT

An ink set including at least three colors of inks of yellow ink with a hue angle $\angle H°$, as defined in CIELAB color space on a recording medium, in the range of about 80° to about 110°, magenta ink with a hue angle $\angle H°$ in the range of about 330° to about 360°, and cyan ink with a hue angle $\angle H°$ in the range of about 230° to about 260°, and the following ink (A) and ink (B): ink (A): ink with a hue angle $\angle H°$ in the range of about 0° to about 80°; and ink (B): ink with a hue angle $\angle H°$ in the range of about 0° to about 80° (where the ink (A) has higher saturation and lower brightness than the magenta ink, and the ink (B) has higher saturation and higher brightness than the magenta ink and higher saturation and lower brightness than the yellow ink, and the hue angle ($\angle H°$) is determined as hue angle $\angle H°=\tan^{-1}(b*/a*)+180$ (when $a*<0$) or $\angle H°=\tan^{-1}(b*/a*)+360$ (when $a*>0$), $a*$ and $b*$ representing the perceived chromaticity index as defined in CIELAB color space).

19 Claims, 9 Drawing Sheets

U.S. PATENT DOCUMENTS

| | | |
|---|---|---|
| 6,843,840 B2 | 1/2005 | Kataoka et al. |
| 6,846,353 B2 | 1/2005 | Sano et al. |
| 6,849,110 B2 | 2/2005 | Sano |
| 6,877,851 B2 | 4/2005 | Watanabe |
| 6,924,327 B2 | 8/2005 | Sano et al. |
| 7,015,259 B2 | 3/2006 | Kataoka et al. |
| 7,156,910 B2 | 1/2007 | Koganehira et al. |
| 7,384,466 B2 | 6/2008 | Sano et al. |
| 7,462,231 B2 * | 12/2008 | Koganehira et al. ......... 106/31.6 |
| 7,481,524 B2 | 1/2009 | Yamamoto et al. |
| 7,494,538 B2 * | 2/2009 | Koganehira et al. ......... 106/31.6 |
| 7,670,418 B2 | 3/2010 | Kato et al. |
| 7,703,908 B2 | 4/2010 | Nishizaki et al. |
| 7,731,789 B2 | 6/2010 | Aoki et al. |
| 7,844,667 B2 | 11/2010 | Ito et al. |
| 2003/0029355 A1 | 2/2003 | Miyabayashi |
| 2003/0097961 A1 | 5/2003 | Yatake et al. |
| 2003/0116055 A1 | 6/2003 | Kubota et al. |
| 2004/0092621 A1 | 5/2004 | Kataoka et al. |
| 2004/0246321 A1 | 12/2004 | Takashima et al. |
| 2005/0011403 A1 | 1/2005 | Mitina et al. |
| 2005/0039632 A1 | 2/2005 | Yamamoto et al. |
| 2005/0041082 A1 | 2/2005 | Kataoka |
| 2005/0203210 A1 | 9/2005 | Kataoka et al. |
| 2005/0235867 A1 * | 10/2005 | Jackson et al. ............. 106/31.27 |
| 2005/0248643 A1 | 11/2005 | Koganehira et al. |
| 2005/0284329 A1 | 12/2005 | Jackson et al. |
| 2005/0284330 A1 | 12/2005 | Jackson |
| 2006/0082629 A1 | 4/2006 | Kato et al. |
| 2006/0232650 A1 | 10/2006 | Sugimoto et al. |
| 2006/0268084 A1 | 11/2006 | Nishizaki et al. |
| 2007/0002109 A1 | 1/2007 | Sato et al. |
| 2007/0097193 A1 * | 5/2007 | Ma et al. ....................... 347/100 |
| 2007/0242118 A1 | 10/2007 | Koganehira et al. |
| 2007/0266887 A1 * | 11/2007 | Koganehira et al. ......... 106/31.6 |
| 2009/0138566 A1 | 5/2009 | Ito et al. |
| 2009/0142555 A1 | 6/2009 | Sano et al. |
| 2009/0169834 A1 | 7/2009 | Sano et al. |
| 2009/0181219 A1 | 7/2009 | Saito et al. |
| 2009/0196995 A1 | 8/2009 | Saito et al. |
| 2009/0297716 A1 | 12/2009 | Koganehira et al. |
| 2009/0297790 A1 | 12/2009 | Sato et al. |
| 2009/0304927 A1 | 12/2009 | Kamibayashi et al. |
| 2009/0308279 A1 | 12/2009 | Koganehira et al. |
| 2009/0315962 A1 | 12/2009 | Kataoka |
| 2009/0317606 A1 | 12/2009 | Kataoka |
| 2009/0317607 A1 | 12/2009 | Kataoka |
| 2010/0043670 A1 | 2/2010 | Shiono et al. |
| 2010/0062161 A1 | 3/2010 | Shiono et al. |
| 2010/0212543 A1 | 8/2010 | Shiono et al. |

FOREIGN PATENT DOCUMENTS

| | | |
|---|---|---|
| DE | 69705904 T2 | 12/2001 |
| DE | 69828579 T2 | 6/2005 |
| EP | 0778321 A2 | 6/1997 |
| EP | 0827039 A1 | 3/1998 |
| EP | 0851005 A2 | 7/1998 |
| EP | 0933406 A1 | 8/1999 |
| EP | 1164173 A1 | 12/2001 |
| EP | 1391301 A1 | 2/2004 |
| EP | 1403334 A1 | 3/2004 |
| EP | 1457535 A1 | 9/2004 |
| EP | 1676893 A1 | 7/2006 |
| EP | 1741762 A1 | 1/2007 |
| EP | 1811003 A1 | 7/2007 |
| EP | 1908806 A1 | 4/2008 |
| JP | 08123017 A | 5/1996 |
| JP | H10123760 A | 5/1998 |
| JP | 10219166 A | 8/1998 |
| JP | 10330640 A | 12/1998 |
| JP | 11166128 A | 6/1999 |
| JP | H11005230 A | 12/1999 |
| JP | 2000351928 | 12/2000 |
| JP | 2001106951 A | 4/2001 |
| JP | 2002030230 A | 1/2002 |
| JP | 2002100959 A | 4/2002 |
| JP | 2003123760 A | 4/2003 |
| JP | 2003160750 A | 6/2003 |
| JP | 2003-253150 A | 9/2003 |
| JP | 2003268275 A | 9/2003 |
| JP | 2003292835 A | 10/2003 |
| JP | 2003313480 A | 11/2003 |
| JP | 2004051881 A | 2/2004 |
| JP | 2004066558 A | 3/2004 |
| JP | 2004246397 A | 9/2004 |
| JP | 2004-276397 A | 10/2004 |
| JP | 2004277585 A | 10/2004 |
| JP | 2004314352 A | 11/2004 |
| JP | 2005120310 A | 5/2005 |
| JP | 2005225955 A | 8/2005 |
| JP | 2005225958 A | 8/2005 |
| JP | 2005255959 A | 9/2005 |
| JP | 2005314546 A | 11/2005 |
| JP | 2006-249335 | 9/2006 |
| JP | 2006-282810 A | 10/2006 |
| JP | 2006282802 A | 10/2006 |
| JP | 2006328140 A | 12/2006 |
| JP | 2007-186641 A | 7/2007 |
| WO | WO-99/05230 | 2/1999 |
| WO | WO-02/100959 A1 | 12/2002 |
| WO | 2004039900 A1 | 5/2004 |
| WO | 2006004001 A1 | 1/2006 |
| WO | WO-2007/116868 A1 | 10/2007 |

OTHER PUBLICATIONS

European Search report dated Mar. 17, 2011 for EP Appl. No. 007740853.2.

Printout of search in Registry Files of STN for Pigment Blue 15:6; 2 pages.

Office Action dated Jul. 23, 2009 for US10/572738 (S0279TPAOWUS).

Office Action dated Feb. 4, 2010 for US10/572738(S0279TPAOWUS).

Office Action dated Aug. 17, 2010 for US12/085141(S0279 UPL2-PCT-US).

Office Action dated Jan. 14, 2008 for US11/732082(S0279VP35-US).

Office Action dated Apr. 3, 2008 for US11/732113(S0279VP70-US).

Office Action dated Oct. 28, 2009 for US12/539084.

Final Office Action dated Sep. 1, 2010 for US12/539084.

Office Action dated Jun. 15, 2010 for US12/545944.

Final Office Action dated Nov. 8, 2010 for US12/545944.

\* cited by examiner

INK SET

CROSS-REFERENCES

The entire disclosure of Japanese Patent Application No. 2007-188016, filed Jul. 19, 2007, is expressly incorporated by reference herein.

BACKGROUND

1. Technical Field

The present invention relates to an ink set, and in particular to an ink set resulting in satisfactorily controlled granularity, controlled false contours, controlled rainbow effect, color reproducibility, and gloss when printed.

2. Related Art

Previously proposed ink sets for color ink jet printing have included three-color ink sets with yellow (Y), magenta (M), and cyan (C) inks, as well as four-color ink sets additionally including black ink (K). Ink sets including red (R) and/or violet (V) ink in addition to YMC inks have also been proposed in order to enhance color reproducibility in the resulting printed product (see WO/02/100959 Pamphlet, for example). Ink sets including the two special color inks of orange (Or) and green (Gr) in addition to YMC inks have also been proposed (see WO/99/05230 Pamphlet, for example).

However, even though printed products obtained with the use of the ink set in WO/02/100959 Pamphlet do have better gloss, further control of interference color (bronzing) is to be desired. Further improvement of gloss on photographic paper base gloss media (such as the photographic paper "Gloss" (Product No. KA420PSK) (by Seiko Epson)) is also to be desired because the pigment solids are at least 3 wt % in printed products obtained with the use of the ink set in WO/99/05230 Pamphlet.

Skin tones are not brought out enough in printed samples obtained with previous ink sets. Specifically, problems with previous ink sets are that granularity deteriorates and false contours occur in the color reproduction of dark areas of skin color, that the dark areas of skin tones turn green (green cast) due to the superimposition of C ink dots and Y ink dots here and there when printed for color reproduction, and that there is an intensification of the phenomenon in which the green from superimposed dots and the red from interfering color become mixed in the dark areas of skin color, resulting in and iridescent shine (rainbow effect), because a reddish interfering color is produced when the C ink pigment solids concentration is 3 wt % or less. Such problems are particularly noticeable in infant portraits taken with incorrect exposure or the like.

SUMMARY

An advantage of some aspects of the invention is the provision of an ink set resulting in satisfactorily controlled granularity, controlled false contours, controlled rainbow effect, color reproducibility, and gloss when printed.

As a result of extensive research, the inventors perfected the invention upon finding that an ink set including specific YMC inks as well as a specific ink (A) and a specific ink (B) resulted in satisfactorily controlled granularity, controlled false contours, controlled rainbow effect, color reproducibility, and gloss when printed.

Specifically, the invention provides (1) an ink set including at least three colors of inks of yellow ink with a hue angle ∠H°, as defined in CIELAB color space on a recording medium, in the range of about 80° to about 110°, magenta ink with a hue angle ∠H° in the range of about 330° to about 360°, and cyan ink with a hue angle ∠H° in the range of about 230° to about 260°, and the following ink (A) and ink (B):

ink (A): ink with a hue angle ∠H° in the range of about 0° to about 80°; and ink (B): ink with a hue angle ∠H° in the range of about 0° to about 80°

(where the ink (A) has higher saturation and lower brightness than the magenta ink, and the ink (B) has higher saturation and higher brightness than the magenta ink and higher saturation and lower brightness than the yellow ink, and the hue angle (∠H°) is determined as hue angle $\angle H° = \tan^{-1}(b*/a*)+180$ (when $a*<0$) or $\angle H° = \tan^{-1}(b*/a*)+360$ (when $a*>0$), $a*$ and $b*$ representing the perceived chromaticity index as defined in CIELAB color space);

(2) the ink set according to an aspect of the invention, wherein the yellow ink and cyan ink include complex pigments;

(3) the ink set according to an aspect of the invention, wherein the yellow ink includes C.I. Pigment Yellow 74 and C.I. Pigment Yellow 129 as pigments, and the cyan ink includes one or two pigments selected from the group of C.I. Pigment Blue 15:4 and C.I. Pigment Blue 15:3;

(4) the ink set according to an aspect of the invention, wherein the cyan ink includes white pigment;

(5) the ink set according to an aspect of the invention, wherein the magenta ink includes γ-type C.I. Pigment Violet 19 and C.I. Pigment Red 202 solid solution as pigment;

(6) the ink set according to an aspect of the invention, wherein the ink (A) is red ink;

(7) the ink set according to an aspect of the invention, wherein the ink (A) is red ink including C.I. Pigment Red 177 and/or C.I. Pigment Red 179 as pigment;

(8) the ink set according to an aspect of the invention, wherein the ink (B) is orange ink;

(9) the ink set according to an aspect of the invention, wherein the ink (B) is orange ink including C.I. Pigment Orange 43 and/or C.I. Pigment Red 242 as pigment;

(10) the ink set according to an aspect of the invention, wherein the mixing ratio of C.I. Pigment Orange 43 to C.I. Pigment Red 242 in the ink (B) is 4:1 to 2:1;

(11) the ink set according to an aspect of the invention, further including blue ink containing C.I. Pigment Blue 15:1 and/or C.I. Pigment Violet 23 as pigment;

(12) the ink set according to an aspect of the is less than 3 wt %;

(13) the ink set according to an aspect of the invention, further including black ink, the black ink including C.I. Pigment Black 7 as pigment;

(14) the ink set according to an aspect of the invention, further including black ink, the black pigment solids concentration being no more than 1 wt %;

(15) the ink set according to an aspect of the invention, further including clear ink;

(16) the ink set according to an aspect of the invention, including at least 3 wt % and no more than 15 wt % $C_5$ to $C_{10}$ alkanediol that may have branches;

(17) the ink set according to an aspect of the invention, including a polyorganosiloxane as surfactant;

(18) the ink set according to an aspect of the invention, including a polyorganosiloxane represented by the following general formula as surfactant;

Chemical Formula 1

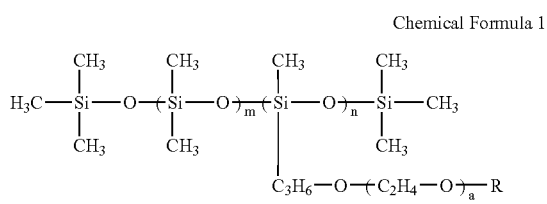

(where R is a hydrogen atom or methyl group, a is an integer of 7 to 11, m is an integer of 20 to 70, and n is an integer of 2 to 5); and

(19) the ink set according to an aspect of the invention, further including a polyorganosiloxane represented by the following general formula as surfactant.

Chemical Formula 2

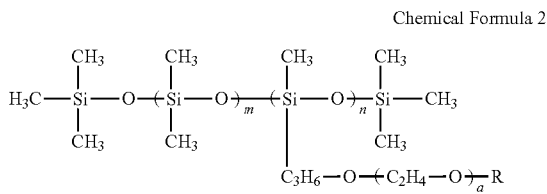

(where R is a hydrogen atom or methyl group, a is an integer of 9 to 13, m is an integer of 2 to 4, and n is an integer of 1 to 2).

The invention makes it possible to provide an ink set resulting in satisfactorily controlled granularity, controlled false contours, controlled rainbow effect, color reproducibility, and gloss when printed.

DESCRIPTION OF EXEMPLARY EMBODIMENTS

Figure 1:
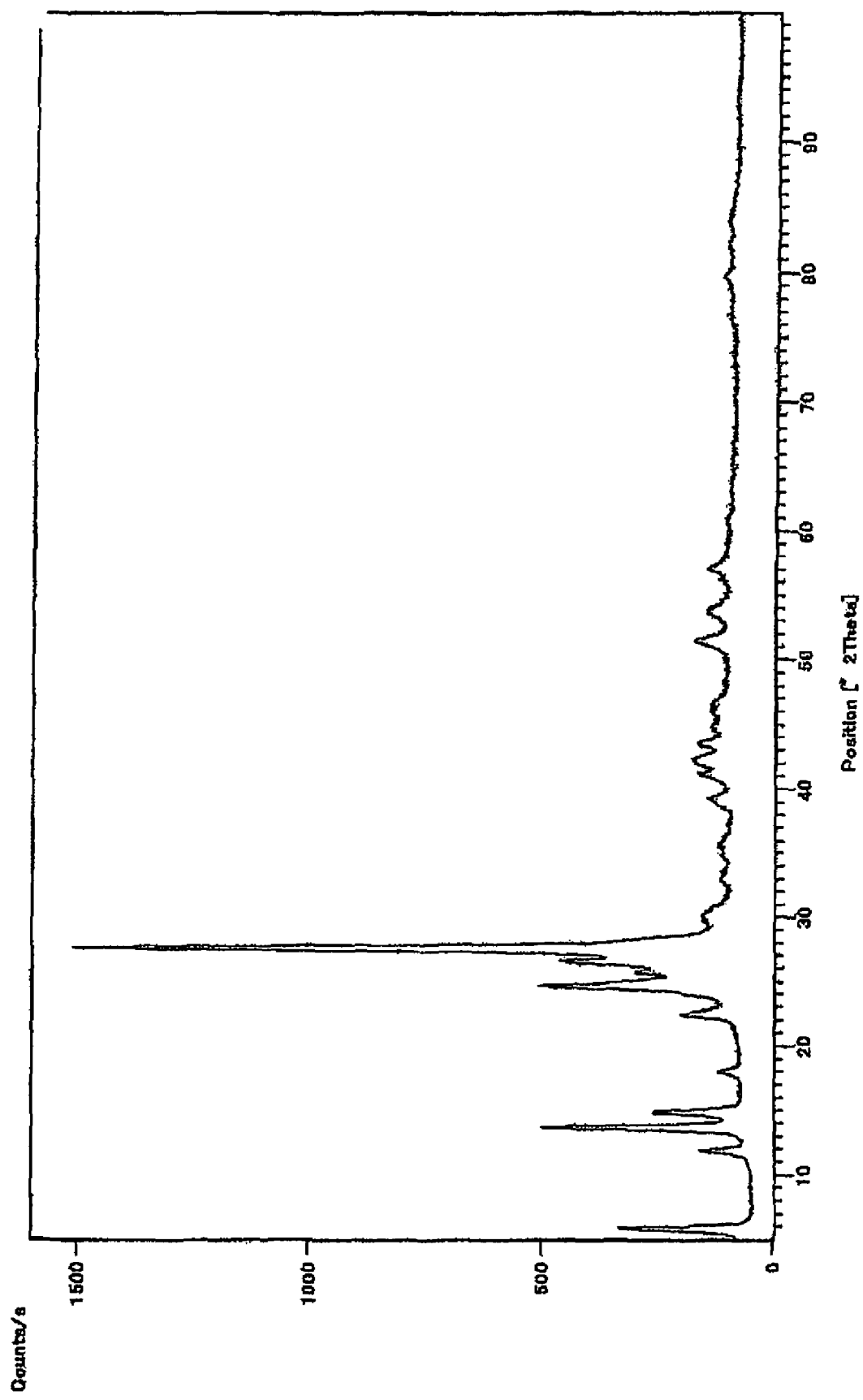
FIG. 1 is a graph of the results of powder X-ray diffraction analysis of a preferred example of the solid solution included in the magenta ink.

Embodiments for working the invention are described below. The following embodiments are merely examples for illustrating the invention, and are not intended to limit the invention to these embodiments alone. The invention can be worked in a variety of forms without departing from the spirit of the invention.

The ink set of the invention includes at least the three colors of inks of yellow ink with a hue angle $\angle H°$, as defined in CIELAB color space on a recording medium, in the range of about 80° to about 110°, magenta ink with a hue angle in the range of about 330° to about 360°, and cyan ink with a hue angle $\angle H°$ in the range of about 230° to about 260°, and the following ink (A) and ink (B):

ink (A): ink with a hue angle $\angle H°$ in the range of about 0° to about 80°; and ink (B): ink with a hue angle $\angle H°$ in the range of about 0° to about 80°

(where the ink (A) has higher saturation and lower brightness than the magenta ink, and the ink (B) has higher saturation and higher brightness than the magenta ink and higher saturation and lower brightness than the yellow ink, and the hue angle ($\angle H°$) is determined as hue angle $\angle H° = \tan^{-1}(b*/a*)+180$ (when $a*<0$) or $\angle H° = \tan^{-1}(b*/a*)+360$ (when $a*>0$), a* and b* representing the perceived chromaticity index as defined in CIELAB color space).

"Recording medium" is preferably a recording medium commonly used in ink jet printing and the like, and in particular is preferably PM photographic paper (by Seiko Epson).

The ink color material is preferably pigment ink.

Such a structure will enable satisfactorily controlled granularity, controlled false contours, controlled rainbow effect, color reproducibility, and gloss when printed. That is, this type of structure will allow skin tone in printing samples top be improved while preserving gloss.

In the color reproduction of dark areas of skin color, it is possible to prevent the deterioration of granularity, control the incidence of false contours, and to minimize rainbow effect which may occur when the ink pigment solids concentration is low.

Color reproducibility in areas of high, intermediate, and low brightness is even better when $a*>0$.

The ink (A) has higher saturation and lower brightness than the M ink, but since the yellow ink has low brightness, there is no deterioration of granularity, and since the M ink and ink (B) have high saturation, false contours can be controlled, allowing the brightness to be lowered with the same hues in skin colors.

The ink (B) has higher saturation and higher brightness than the M ink, and has higher saturation and lower brightness than the Y ink, preventing deterioration of granularity despite the active generation of the ink (B). The ink (B) can thus be used instead of Y ink to effectively reduce the incidence of superimposed C ink dots and Y ink dots, and to control green cast.

The difference in hue angle between the C ink and the ink (B) is about 180 degrees, allowing green cast to be avoided when the C ink is generated, effectively lowering the brightness.

The yellow ink preferably includes a complex pigment.

Examples of pigments which may be included in the yellow ink are C.I. Pigment Yellow (PY) 1, 2, 3, 12, 14, 16, 17, 73, 74, 75, 83, 93, 95, 97, 98, 109, 110, 114, 128, 129, 138, 139, 147, 150, 151, 154, 155, 180, and 185, which may be used individually or in combinations of two or more.

The yellow ink will in particular preferably include C.I. Pigment Yellow 74 (PY 74) and C.I. Pigment Yellow 129 (PY 129) as pigment.

The cyan ink will preferably include a complex pigment.

Examples of pigments which may be included in the cyan ink are C.I. Pigment Blue (PB) 1, 2, 3, 15:3, 15:4, 15:34, 16, 22, and 60, C.I. Vat Blue 4 and 60, and C.I. Pigment Blue 76 (PB 76), which may be used individually or in combinations of two or more.

The cyan ink will in particular preferably include one or two selected from the group of C.I. Pigment Blue 15:4 (PB 15:4) and C.I. Pigment Blue 15:3 as pigment.

The cyan ink will also preferably include a white pigment. Examples of white pigments include Group IV element oxides such as titanium dioxide and zirconia dioxide. The cyan ink includes a white pigment to allow the red light of interference color and the rainbow effect to be controlled.

Examples of pigments which may be included in the magenta ink include C.I. Pigment Red (PR) 5, 7, 12, 48, (Ca), 48 (Mn), 57 (Ca), 57:1, 112, 122, 123, 168, 184, 202, and 209, and C.I. Pigment Violet 19 (PV 19), which may be used individually or in combinations of two or more.

The magenta ink will in particular preferably include γ-type C.I. Pigment Violet 19 (PV 19) and C.I. Pigment Red 202 (PR 202) solid solution as the pigment. "γ-type C.I. Pigment Violet 19 and C.I. Pigment Red 202 solid solution" means crystals in which the γ-type PV 19 and PR 202 are in the form of solids melted together. The proportions of the γ-type PV 19 and PR 202 of the solid solution can be adjusted as desired within the range of the invention, but the weight of the γ-type PV 19 is preferably greater than the weight of the PV 202.

FIG. 1 shows the results of powder X-ray diffraction analysis of a preferred example of the solid solution. In this analysis, samples in 0.5 mm deep glass cells were measured using a PaNalytical X'PertPro.

The preferred magenta ink may also include another magenta pigment such as PV 19 and PV 32 in addition to the solid solution.

The ink (A) is preferably red ink.

One or more selected from the group consisting of C.I. Pigment Red (PR) 17, 49:2, 112, 149, 177, 178, 179, 188, 254, 255, and 264 may preferably be used as pigments included in the ink (A).

The ink (A) is in particular preferably red ink including C.I. Pigment Red 177 (PR 177) and/or C.I. Pigment Red 179 (PR 179) as pigment.

The ink (B) is preferably orange ink.

One or more selected from the group consisting of C.I. Pigment Orange 5, 43, 36, 62, and 242 may preferably be used as pigment included in the ink (B).

The ink (B) in particular is preferably orange ink including C.I. Pigment Orange 43 (POr 43) and/or C.I. Pigment Red 242 (PR 242) as pigment. When C.I. Pigment Orange 43 (POr 43) and/or C.I. Pigment Red 242 (PR 242) as pigment is included as pigment, the mixing ratio of C.I. Pigment Orange 43 to C.I. Pigment Red 242 is preferably 4:1 to 2:1 in the interests of obtaining ink with both light resistance and chromogenic properties.

The ink set may also contain blue ink including C.I. Pigment Blue 76 (PB 76), C.I. Pigment Blue 15:1 (PB 15:1), nickel phthalocyanin, and/or C.I. Pigment Violet 23 (PV 23) as pigment.

The pigment solids concentration in the ink is preferably less than 3 wt %.

The ink set may further include black ink, where the black ink may include C.I. Pigment Black 7 as pigment.

The ink set may further include black ink, where the black ink pigment solids concentration is no more than 1 wt %.

Examples of pigments which may be included in the black ink are inorganic pigments such as iron oxide pigments and carbon black (C.I. Pigment Black 7) such as furnace black, lamp black, acetylene black, and channel black; and organic pigments such as aniline black (C.I. Pigment Black 1). The use of carbon black is particularly desirable. Examples of desirable carbon blacks include Mitsubishi's No. 2300, No. 900, MCF88, No. 33, No. 40, No. 52, MA7, MA8, MA100, and No. 2200B, etc., Columbia's Raven 5750, Raven 5250, Raven 5000, Raven 3500, Raven 1255, and Raven 700, etc., Cabot's Regal 400R, Regal 400R, Regal 1660R, Mogul 1, Monarch 700, Monarch 800, Monarch 880, Monarch 900, Monarch 1000, Monarch 1100, Monarch 1300, and Monarch 1400, etc., and Degussa's Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black A, etc.

The ink set may further include a colorant-free clear ink. The inclusion of a clear ink will give printed images with better gloss, chromogenic properties, rub-fastness, and storage stability.

Each ink will also preferably include a dispersant to enhance the dispersion stability of the pigments. Desirable examples of dispersants include cationic dispersants, anionic dispersants, nonionic dispersants, and surfactants.

Examples of anionic dispersants include polyacrylic acids, polymethacrylic acids, acrylic acid-acrylonitrile copolymers, vinyl acetate-acrylic acid ester copolymers, acrylic acid-alkyl acrylate ester copolymers, styrene-acrylic acid copolymers, styrene-methacrylic acid copolymers, styrene-acrylic acid-alkyl acrylate ester copolymers, styrene-methacrylic acid-alkyl acrylate ester copolymers, styrene-α-methylstyrene-acrylic acid copolymers, styrene-α-methylstyrene-acrylic acid-alkyl acrylate ester copolymers, styrene-maleic acid copolymers, vinyl naphthalene-maleic acid copolymers, vinyl acetate-ethylene copolymers, vinyl acetate-fatty acid vinyl ethylene copolymers, vinyl acetate maleic acid ester copolymers, vinyl acetate-crotonic acid copolymers, and vinyl acetate-acrylic acid copolymers.

Examples of nonionic dispersants include polyvinyl pyrrolidone, polypropylene glycol, and vinyl pyrrolidone-vinyl acetate copolymers.

Examples of surfactants serving as dispersants include anionic surfactants such as sodium dodecylbenzenesulfonate, sodium laurate, and polyoxyethylene alkyl ether sulfate ammonium salts, and nonionic surfactants such as polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides. The use of styrene-(meth)acrylic acid copolymers is particularly preferred for the sake of better pigment dispersion stability.

The dispersant is preferably included in the ink in an amount of 0.1 to 10 wt %, and preferably 0.3 to 6 wt %, based on solids.

The inks preferably include at least 3 wt % and no more than 15 wt % $C_5$ to $C_{10}$ alkanediol that may have branches. A water-soluble 1,2-alkanediol is in particular preferably included in an amount of 8 to 15 wt %. Alternatively, a water-soluble double-terminated alkanediol is preferably included in an amount of 3 to 8 wt %. 4-methyl-1,2-pentane diol, 1,2-pentane diol, 3,3-dimethyl-1,2-butane diol, 4,4-dimethyl-1,2-pentane diol, 5-methyl-1,2-hexane diol, 1,2-hexane diol, 1,2-heptane diol, and 1,2-octane diol are preferred. 4-methyl-1,2-pentane diol and 1,2-hexane diol are more desirable.

The inks will also preferably include one or a combination of two or more polyhydric alcohols, saccharides, and polyhydric alcohols with ethylene oxide changes as humectants. The addition of such humectants will prevent ink from drying and clogging ink jet printer heads when used in ink jet printing.

Examples of humectants include polyhydric alcohols such as ethylene glycol, diethylene glycol, triethylene glycol polyethylene glycol, polypropylene glycol, propylene glycol, butylene glycol, 1,2,6-hexane triol, thioglycol, hexylene glycol, glycerin, trimethylol ethane, and trimethylol propane; saccharides such as sugar alcohols; and polyhydric alcohols with ethylene oxide chains, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. These may be used individually or in combinations of two or more.

The humectants are preferably included in the inks in an amount of 3 to 16 wt %, based on solids.

The inks may also include one or a combination of two or more lactones, lactams (pyrrolidones), alkanediols, and glycol ethers as penetrants. The addition of a penetrant can enhance wettability on recording media to enhance the penetration of ink.

Examples of penetrants include lactones such as γ-butyrolactone; lactams (pyrrolidones) such as 2-pyrrolidone and N-methyl-2-pyrrolidone; alkanediols such as 1,2-pentane diol, 4-methyl-1,2-pentane diol, and 1,2-hexane diol; and glycol ethers such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

The penetrant is preferably included in an amount of 8 to 15 wt %, based on solids, in the inks.

The inks may also include one or a combination of two or more acetylene glycols and polysiloxanes as a surfactant. The addition of surfactant can enhance wettability on recording media to enhance the penetration of ink.

The inks will preferably include a polyorganosiloxane as a surfactant.

When the magenta ink composition of the invention includes a polyorganosiloxane, one polyorganosiloxane may be included, or two or more polyorganosiloxanes may be included.

The inks will preferably include a polyorganosiloxane represented by the following general formula.

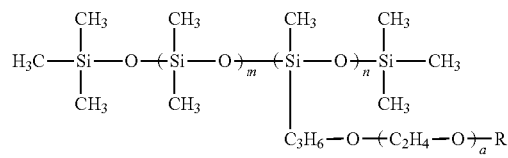

Chemical Formula 3

(where R is a hydrogen atom or methyl group, a is an integer of 7 to 11, m is an integer of 20 to 70, and n is an integer of 2 to 5)

This preferred structure will allow a printed product with even better gloss to be obtained.

The inks will also preferably include a polyorganosiloxane represented by the following general formula in addition to the polyorganosiloxane represented by the above general formula.

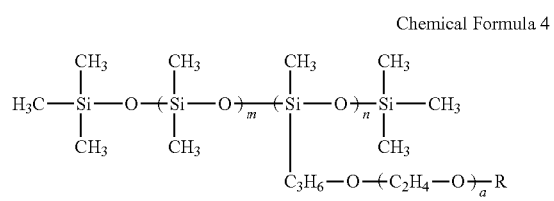

Chemical Formula 4

(where R is a hydrogen atom or methyl group, a is an integer of 9 to 13, m is an integer of 2 to 4, and n is an integer of 1 to 2)

This preferred structure can control aggregate irregularities during printing on print paper.

The inks may also include low-boiling organic solvents to shorten the ink drying time. Examples of low-boiling organic solvents include methanol, ethanol, n-propyl alcohol, isopropyl alcohol, n-butanol, sec-butanol, tert-butanol, iso-butanol, and n-pentanol, which may be used individually or in combinations of two or more. Monohydric alcohols are particularly desirable.

The inks will preferably contain components such as the above pigments, dispersants, humectants, low-boiling organic solvents, penetrants, and surfactants, with water as the balance. The water is preferably purified water or ultrapurified water such as deionized water, ultrafiltration treated water, reverse osmosis treated water, or distilled water. Such water which has been sterilized by UV irradiation, treated with the addition of hydrogen peroxide, or the like is preferred because mold or bacterial can be prevented from growing over long periods of time.

The inks can also contain additives as needed, such as water-soluble rosins or other fixatives, sodium benzoate or other fungicides/preservatives, allophanates or other antioxidants/UV absorbents, chelates, oxygen absorbers, pH regulators, and other additives, either individually or in combinations of two or more.

Examples of pH regulators include potassium hydroxide, sodium hydroxide, triethanolamine, and tripropanolamine. The amount of pH regulator to be added will be determined according to the intended pH.

The ink set of the invention is preferably used in ink jet printing, which is a printing method in which droplets of ink are ejected from nozzles so as to adhere to recording media to form images such as characters or graphics, and is in particular preferably used in on-demand type ink jet printing.

Examples of on-demand type ink jet printing include piezo element printing in which piezo elements in the printer head are used for printing, and thermal jet printing in which printing is done using thermal energy from a heater or the like for heating resistor elements in the printer head. The invention is suitable for use in any ink jet printing method.

EXAMPLES

The invention is illustrated in further detail by, but is not limited to, the following examples. Persons of ordinary skill in the art will be able to work a variety of modifications in addition to the following examples, such modifications being encompassed by the scope of the claims.

Example 1

A magenta ink composition including γ-type PV 19 and PR 202 solid solution (referred to below as solid solution), where the γ-type PV 19 weighed more than the PR 202, was prepared using the following formulation as magenta ink. Yellow ink, cyan ink, red ink, orange ink, and black ink were prepared using the following formulations, giving an ink set.

Magenta Ink Composition: Example 1

| | |
|---|---|
| solid solution | 2.2 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Yellow Ink Composition: Example 1

| | |
|---|---|
| PY 74 | 1.5 wt % |
| PY 129 | 0.5 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Cyan Ink Composition (I): Example 1

| | |
|---|---|
| PB 15:4 | 1.5 wt % |
| titanium dioxide | 0.5 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Red Ink Composition: Example 1

| | |
|---|---|
| PR 177 | 2.5 wt % |
| styrene-acrylic acid copolymer resin | 1.0 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Orange Ink Composition: Example 1

| | |
|---|---|
| POr 43 | 2.0 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Black Ink Composition: Example 1

| | |
|---|---|
| PCB 7 | 1.5 wt % |
| PB 15:4 | 0.2 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Comparative Example 1

Magenta ink, yellow ink, cyan ink, and blue ink were prepared using the following formulations, giving the ink set of Comparative Example 1, which included red ink and black ink with the same compositions as in Example 1.

Magenta Ink Composition: Comparative Example 1

| | |
|---|---|
| PV 19 | 2.0 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Yellow Ink Composition: Comparative Example 1

| | |
|---|---|
| PY 74 | 3.0 wt % |
| styrene-acrylic acid copolymer resin | 1.2 wt % |
| glycerin | 10.0 wt % |
| 4-methyl-1,2-pentane diol | 8.0 wt % |
| triethanolamine | 0.9 wt % |

-continued

| | |
|---|---|
| BYKUV 3510 (BYK-Chemie) | 0.1 wt % |
| purified water | balance |
| Total | 100.0 wt % |

Cyan Ink Composition: Comparative Example 1

| | |
|---|---|
| PB 15:4 | 1.5 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.00 wt % |

Blue Ink Composition: Comparative Example 1

| | |
|---|---|
| PV 23 | 1.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

The ink compositions prepared above were placed in an ink cartridge for an ink jet printer (tradename "MC-2000", by Seiko Epson) and were printed onto photographic paper "Gloss" (by Seiko Epson) at a resolution of 1440×1440 dpi and varying Duty (%). The $L^*$, $a^*$, and $b^*$ values of each printed product were measured.

"Duty" is defined as: duty=(number of printed dots)/(vertical resolution×horizontal resolution)×100(%)

The $L^*$, $a^*$, $b^*$, and $C^*$ values were determined using a GRETAG MACBETH SPM50 spectrophotometer (by GRETAG). Specifically, the white reference was absolute white, with a light source D50 and no light source filter, and the view angle was 2°.

The value for h (hue angle (°)) was determined based on $\angle H° = \tan^{-1}(b^*/a^*) + 180$ (when $a^* < 0$) or $\angle H° = \tan^{-1}(b^*/a^*) + 360$ (when $a^* > 0$).

Tables 1 and 2 give the results for the ink set of Example 1.

TABLE 1

| | Duty | L* | a* | b* | C* | h |
|---|---|---|---|---|---|---|
| Y | 255 | 83.3 | −2.9 | 106.4 | 106.4 | 91.6 |
| | 230 | 83.6 | −4.9 | 105.4 | 105.5 | 92.7 |
| | 205 | 84.1 | −4.6 | 105.1 | 105.2 | 92.5 |
| | 180 | 85.4 | −6.7 | 104.9 | 105.1 | 93.6 |
| | 155 | 85.2 | −8.3 | 100.8 | 101.1 | 94.7 |
| | 130 | 87.2 | −7.7 | 97.6 | 97.9 | 94.5 |
| | 105 | 88.0 | −11.5 | 85.3 | 86.1 | 97.7 |
| | 80 | 87.7 | −11.1 | 66.5 | 67.4 | 99.5 |
| | 55 | 89.3 | −8.4 | 44.5 | 45.3 | 100.7 |
| | 30 | 91.7 | −5.5 | 22.9 | 23.6 | 103.5 |
| | 15 | 93.1 | −3.2 | 10.0 | 10.5 | 107.9 |
| M | 255 | 51.6 | 82.6 | −14.6 | 83.9 | 350.0 |
| | 230 | 52.6 | 82.1 | −17.1 | 83.8 | 348.3 |
| | 205 | 54.5 | 81.0 | −19.1 | 83.2 | 346.7 |
| | 180 | 56.0 | 77.6 | −23.5 | 81.1 | 343.2 |

TABLE 1-continued

| | Duty | L* | a* | b* | C* | h |
|---|---|---|---|---|---|---|
| | 155 | 58.4 | 73.4 | −24.7 | 77.5 | 341.4 |
| | 130 | 63.5 | 66.2 | −24.1 | 70.4 | 340.0 |
| | 105 | 67.8 | 54.8 | −24.8 | 60.2 | 335.6 |
| | 80 | 72.2 | 42.8 | −22.3 | 48.3 | 332.5 |
| | 55 | 78.7 | 29.6 | −16.7 | 34.0 | 330.6 |
| | 30 | 85.6 | 16.8 | −10.9 | 20.0 | 326.9 |
| | 15 | 90.0 | 8.6 | −7.4 | 11.4 | 319.2 |
| C | 255 | 48.6 | −34.8 | −60.9 | 70.1 | 240.3 |
| | 230 | 49.9 | −36.8 | −59.8 | 70.2 | 238.4 |
| | 205 | 52.4 | −40.1 | −57.7 | 70.3 | 235.2 |
| | 180 | 55.4 | −43.3 | −54.8 | 69.9 | 231.7 |
| | 155 | 58.5 | −43.1 | −51.8 | 67.3 | 230.2 |
| | 130 | 63.6 | −44.6 | −44.6 | 63.1 | 225.0 |
| | 105 | 68.5 | −38.8 | −39.8 | 55.5 | 225.7 |
| | 80 | 73.0 | −30.8 | −33.1 | 45.2 | 227.1 |
| | 55 | 79.2 | −21.6 | −24.8 | 32.9 | 228.9 |
| | 30 | 85.8 | −12.4 | −16.0 | 20.2 | 232.3 |
| | 15 | 90.0 | −6.5 | −10.1 | 12.0 | 237.4 |

TABLE 2

| | Duty | L* | a* | b* | C* | h |
|---|---|---|---|---|---|---|
| R | 255 | 41.7 | 77.9 | 44.7 | 89.8 | 29.8 |
| | 230 | 42.8 | 77.7 | 38.2 | 86.5 | 26.2 |
| | 205 | 44.5 | 77.0 | 30.3 | 82.8 | 21.5 |
| | 180 | 46.8 | 74.7 | 21.1 | 77.6 | 15.8 |
| | 155 | 50.5 | 69.9 | 12.1 | 70.9 | 9.8 |
| | 130 | 55.5 | 61.7 | 4.6 | 61.9 | 4.3 |
| | 105 | 62.7 | 50.5 | −0.1 | 50.5 | 359.9 |
| | 80 | 70.1 | 36.7 | −4.0 | 37.0 | 353.8 |
| | 55 | 78.1 | 23.9 | −4.9 | 24.3 | 348.5 |
| | 30 | 85.6 | 13.2 | −4.8 | 14.0 | 340.0 |
| | 15 | 90.3 | 6.6 | −4.4 | 7.9 | 326.0 |
| Or | 255 | 59.2 | 65.4 | 93.6 | 114.1 | 55.1 |
| | 230 | 59.9 | 64.2 | 93.3 | 113.3 | 55.5 |
| | 205 | 61.3 | 62.5 | 91.7 | 111.0 | 55.7 |
| | 180 | 62.8 | 59.2 | 87.2 | 105.4 | 55.8 |
| | 155 | 64.3 | 56.4 | 78.3 | 96.5 | 54.2 |
| | 130 | 68.1 | 51.6 | 66.8 | 84.4 | 52.3 |
| | 105 | 71.4 | 43.2 | 51.5 | 67.2 | 50.1 |
| | 80 | 74.8 | 34.3 | 36.4 | 50.0 | 46.7 |
| | 55 | 80.3 | 24.2 | 22.0 | 32.7 | 42.3 |
| | 30 | 86.4 | 13.8 | 10.1 | 17.0 | 36.2 |
| | 15 | 90.4 | 6.9 | 3.2 | 7.6 | 25.0 |
| K | 255 | 2.7 | −0.2 | −0.3 | 0.3 | 234.2 |
| | 230 | 3.4 | −0.2 | 0.3 | 0.3 | 116.6 |
| | 205 | 5.0 | −0.2 | 1.8 | 1.8 | 97.2 |
| | 180 | 10.1 | −0.3 | 5.3 | 5.3 | 93.4 |
| | 155 | 18.8 | −0.7 | 7.0 | 7.0 | 95.6 |
| | 130 | 29.3 | −0.5 | 8.1 | 8.1 | 93.5 |
| | 105 | 41.4 | −0.9 | 7.7 | 7.7 | 96.5 |
| | 80 | 53.1 | −1.1 | 5.3 | 5.4 | 101.9 |
| | 55 | 66.6 | −0.9 | 2.4 | 2.6 | 109.5 |
| | 30 | 78.8 | −0.5 | 0.1 | 0.5 | 174.1 |
| | 15 | 86.3 | −0.2 | −1.4 | 1.4 | 261.1 |

Tables 3 and 4 give the results for the ink set of Comparative Example 1.

TABLE 3

| | Duty | L* | a* | b* | C* | h |
|---|---|---|---|---|---|---|
| Y | 255 | 88.2 | −1.3 | 108.9 | 108.9 | 90.7 |
| | 230 | 88.5 | −2.1 | 108.6 | 108.6 | 91.1 |
| | 205 | 88.7 | −3.1 | 108.3 | 108.4 | 91.6 |
| | 180 | 88.9 | −4.3 | 107.7 | 107.8 | 92.3 |
| | 155 | 89.2 | −6.0 | 106.6 | 106.7 | 93.2 |
| | 130 | 89.7 | −7.3 | 104.7 | 105.0 | 94.0 |
| | 105 | 90.0 | −9.2 | 99.5 | 100.0 | 95.3 |
| | 80 | 91.1 | −9.9 | 87.9 | 88.4 | 96.4 |
| | 55 | 92.0 | −10.6 | 63.8 | 64.7 | 99.4 |
| | 30 | 93.3 | −8.2 | 35.2 | 36.1 | 103.2 |

TABLE 3-continued

|   | Duty | L* | a* | b* | C* | h |
|---|------|------|------|------|------|------|
| M | 15 | 94.0 | −5.0 | 15.8 | 16.6 | 107.5 |
|   | 255 | 52.5 | 80.6 | 1.7 | 80.6 | 1.2 |
|   | 230 | 53.6 | 79.8 | −1.6 | 79.8 | 358.9 |
|   | 205 | 55.2 | 77.7 | −6.4 | 78.0 | 355.3 |
|   | 180 | 58.2 | 74.4 | −10.0 | 75.0 | 352.3 |
|   | 155 | 61.0 | 68.1 | −14.1 | 69.6 | 348.3 |
|   | 130 | 66.2 | 59.6 | −14.0 | 61.2 | 346.8 |
|   | 105 | 71.4 | 47.7 | −15.1 | 50.0 | 342.5 |
|   | 80 | 76.1 | 36.0 | −14.2 | 38.7 | 338.5 |
|   | 55 | 82.2 | 24.5 | −11.0 | 26.8 | 335.7 |
|   | 30 | 87.8 | 14.0 | −7.8 | 16.0 | 330.7 |
|   | 15 | 91.7 | 6.9 | −6.0 | 9.2 | 319.1 |
| C | 255 | 48.8 | −32.6 | −65.4 | 73.1 | 243.5 |
|   | 230 | 50.6 | −35.6 | −63.8 | 73.1 | 240.8 |
|   | 205 | 53.2 | −39.5 | −61.4 | 73.0 | 237.2 |
|   | 180 | 56.1 | −41.9 | −58.6 | 72.0 | 234.4 |
|   | 155 | 60.4 | −45.6 | −52.2 | 69.3 | 228.9 |
|   | 130 | 65.1 | −43.4 | −47.5 | 64.3 | 227.6 |
|   | 105 | 69.3 | −37.3 | −41.2 | 55.6 | 227.8 |
|   | 80 | 74.5 | −30.0 | −33.6 | 45.0 | 228.2 |
|   | 55 | 81.1 | −21.0 | −24.8 | 32.5 | 229.7 |
|   | 30 | 87.3 | −12.3 | −15.9 | 20.1 | 232.3 |
|   | 15 | 91.2 | −6.6 | −10.0 | 12.0 | 236.8 |

TABLE 4

|   | Duty | L* | a* | b* | C* | h |
|---|------|------|------|------|------|------|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | −0.1 | 50.5 | 359.9 |
|   | 80 | 70.1 | 36.7 | −4.0 | 37.0 | 353.8 |
|   | 55 | 78.1 | 23.9 | −4.9 | 24.3 | 348.5 |
|   | 30 | 85.6 | 13.2 | −4.8 | 14.0 | 340.0 |
|   | 15 | 90.3 | 6.6 | −4.4 | 7.9 | 326.0 |
| V | 255 | 14.2 | 35.3 | −46.0 | 58.0 | 307.5 |
|   | 230 | 14.9 | 41.6 | −53.0 | 67.4 | 308.1 |
|   | 205 | 16.0 | 47.8 | −59.7 | 76.5 | 308.6 |
|   | 180 | 18.4 | 53.4 | −65.6 | 84.6 | 309.1 |
|   | 155 | 22.2 | 57.1 | −69.7 | 90.1 | 309.4 |
|   | 130 | 28.4 | 57.6 | −69.8 | 90.5 | 309.5 |
|   | 105 | 38.3 | 52.3 | −63.8 | 82.5 | 309.3 |
|   | 80 | 50.4 | 41.7 | −52.6 | 67.1 | 308.4 |
|   | 55 | 64.5 | 28.1 | −37.8 | 47.1 | 306.7 |
|   | 30 | 77.9 | 15.6 | −23.4 | 28.2 | 303.7 |
|   | 15 | 86.5 | 7.7 | −14.0 | 16.0 | 298.7 |
| K | 255 | 2.7 | −0.2 | −0.3 | 0.3 | 234.2 |
|   | 230 | 3.4 | −0.2 | 0.3 | 0.3 | 116.6 |
|   | 205 | 5.0 | −0.2 | 1.8 | 1.8 | 97.2 |
|   | 180 | 10.1 | −0.3 | 5.3 | 5.3 | 93.4 |
|   | 155 | 18.8 | −0.7 | 7.0 | 7.0 | 95.6 |
|   | 130 | 29.3 | −0.5 | 8.1 | 8.1 | 93.5 |
|   | 105 | 41.4 | −0.9 | 7.7 | 7.7 | 96.5 |
|   | 80 | 53.1 | −1.1 | 5.3 | 5.4 | 101.9 |
|   | 55 | 66.6 | −0.9 | 2.4 | 2.6 | 109.5 |
|   | 30 | 78.8 | −0.5 | 0.1 | 0.5 | 174.1 |
|   | 15 | 86.3 | −0.2 | −1.4 | 1.4 | 261.1 |

Example 2

A magenta ink composition including γ-type PV 19 and PR solid solution (referred to below as solid solution), where the γ-type PV 19 weighed more than the PR 202, was prepared using the following formulation as magenta ink. Yellow ink, cyan ink, red ink, orange ink, and black ink were prepared using the following formulations, giving an ink set.

Magenta Ink Composition: Example 2

| solid solution | 2.2 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Yellow Ink Composition: Example 2

| PY 74 | 1.5 wt % |
| PY 129 | 0.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Cyan Ink Composition: Example 2

| PB 15:4 | |
| titanium dioxide | 0.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUM 3510 (BYK-Chemie) | 0.1 wt % |
| purified water | balance |
| Total | 100.0 wt % |

Red Ink Composition: Example 2

| PR 177 | 2.5 wt % |
| styrene-acrylic acid copolymer resin | 1.0 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Orange Ink Composition: Example 2

| POr 43 | 1.5 wt % |
| POr 242 | 0.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |

-continued

| | |
|---|---|
| BYKUV 3510 (BYK-Chemie) | 0.1 wt % |
| purified water | balance |
| Total | 100.0 wt % |

Back Ink Composition: Example 2

| | |
|---|---|
| PCB 7 | 1.5 wt % |
| PB 15:4 | 0.2 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Comparative Example 2

Magenta ink, yellow ink, cyan ink, and blue ink were prepared using the following formulations, giving the ink set of Comparative Example 2, which included red ink and black ink with the same compositions as in Example 2.

Magenta Ink Composition: Comparative Example 2

| | |
|---|---|
| PV 19 | 2.0 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Yellow Ink Composition: Comparative Example 2

| | |
|---|---|
| PY 74 | 3.0 wt % |
| styrene-acrylic acid copolymer resin | 1.2 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Cyan Ink Composition: Comparative Example 2

| | |
|---|---|
| PB 15:4 | 1.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

Blue Ink Composition: Comparative Example 2

| | |
|---|---|
| PV 23 | 1.5 wt % |
| styrene-acrylic acid copolymer resin | 0.8 wt % |
| glycerin | 10.0 wt % |
| 1,2-hexane diol | 8.0 wt % |
| 1,5-pentane diol | 3.0 wt % |
| triethanolamine | 0.9 wt % |
| BYKUV 3510 (BYK-Chemie) | 0.1 wt % |
| purified water | balance |
| Total | 100.0 wt % |

The ink compositions prepared above were placed in an ink cartridge for an ink jet printer (tradename "MC-2000", by Seiko Epson) and were printed onto photographic paper "Gloss" (by Seiko Epson) at a resolution of 1440×1440 dpi and varying Duty (%). The L*, a*, and b* values of each printed product were measured.

"Duty" is defined as: duty=(number of printed dots)/(vertical resolution×horizontal resolution)×100 (%)

The L*, a*, b*, and C* values were determined using a GRETAG SPM spectrophotometer (by GRETAG). Specifically, the white reference was absolute white, with a light source D50 and no light source filter, and the view angle was 2°.

The value for h (hue angle (°)) was determined based on ∠H°=tan$^{-1}$(b*/a*)+180 (when a*<0) or ∠H°=tan$^{-1}$(b*/a*)+360 (when a*>0).

Tables 5 and 6 give the results for the ink set of Example 2.

TABLE 5

| | Duty | L* | a* | b* | C* | h |
|---|---|---|---|---|---|---|
| Y | 255 | 83.3 | −2.9 | 106.4 | 106.4 | 91.6 |
|   | 230 | 83.6 | −4.9 | 105.4 | 105.5 | 92.7 |
|   | 205 | 84.1 | −4.6 | 105.1 | 105.2 | 92.5 |
|   | 180 | 85.4 | −6.7 | 104.9 | 105.1 | 93.6 |
|   | 155 | 85.2 | −8.3 | 100.8 | 101.1 | 94.7 |
|   | 130 | 87.2 | −7.7 | 97.6 | 97.9 | 94.5 |
|   | 105 | 88.0 | −11.5 | 85.3 | 86.1 | 97.7 |
|   | 80 | 87.7 | −11.1 | 66.5 | 67.4 | 99.5 |
|   | 55 | 89.3 | −8.4 | 44.5 | 45.3 | 100.7 |
|   | 30 | 91.7 | −5.5 | 22.9 | 23.6 | 103.5 |
|   | 15 | 93.1 | −3.2 | 10.0 | 10.5 | 107.9 |
| M | 255 | 51.6 | 82.6 | −14.6 | 83.9 | 350.0 |
|   | 230 | 52.6 | 82.1 | −17.1 | 83.8 | 348.3 |
|   | 205 | 54.5 | 81.0 | −19.1 | 83.2 | 346.7 |
|   | 180 | 56.0 | 77.6 | −23.5 | 81.1 | 343.2 |
|   | 155 | 58.4 | 73.4 | −24.7 | 77.5 | 341.4 |
|   | 130 | 63.5 | 66.2 | −24.1 | 70.4 | 340.0 |
|   | 105 | 67.8 | 54.8 | −24.8 | 60.2 | 335.6 |
|   | 80 | 72.2 | 42.8 | −22.3 | 48.3 | 332.5 |
|   | 55 | 78.7 | 29.6 | −16.7 | 34.0 | 330.6 |
|   | 30 | 85.6 | 16.8 | −10.9 | 20.0 | 326.9 |
|   | 15 | 90.0 | 8.6 | −7.4 | 11.4 | 319.2 |
| C | 255 | 48.6 | −34.8 | −60.9 | 70.1 | 240.3 |
|   | 230 | 49.9 | −36.8 | −59.8 | 70.2 | 238.4 |
|   | 205 | 52.4 | −40.1 | −57.7 | 70.3 | 235.2 |
|   | 180 | 55.4 | −43.3 | −54.8 | 69.9 | 231.7 |
|   | 155 | 58.5 | −43.1 | −51.8 | 67.3 | 230.2 |
|   | 130 | 63.6 | −44.6 | −44.6 | 63.1 | 225.0 |
|   | 105 | 68.5 | −38.8 | −39.8 | 55.5 | 225.7 |
|   | 80 | 73.0 | −30.8 | −33.1 | 45.2 | 227.1 |
|   | 55 | 79.2 | −21.6 | −24.8 | 32.9 | 228.9 |
|   | 30 | 85.8 | −12.4 | −16.0 | 20.2 | 232.3 |
|   | 15 | 90.0 | −6.5 | −10.1 | 12.0 | 237.4 |

TABLE 6

|   | Duty | L* | a* | b* | C* | h |
|---|---|---|---|---|---|---|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | −0.1 | 50.5 | 359.9 |
|   | 80 | 70.1 | 36.7 | −4.0 | 37.0 | 353.8 |
|   | 55 | 78.1 | 23.9 | −4.9 | 24.3 | 348.5 |
|   | 30 | 85.6 | 13.2 | −4.8 | 14.0 | 340.0 |
|   | 15 | 90.3 | 6.6 | −4.4 | 7.9 | 326.0 |
| Or | 255 | 61.8 | 61.6 | 92.6 | 111.2 | 56.3 |
|   | 230 | 62.0 | 60.5 | 92.4 | 110.5 | 56.8 |
|   | 205 | 62.7 | 59.6 | 90.2 | 108.1 | 56.6 |
|   | 180 | 63.5 | 59.0 | 89.2 | 106.9 | 56.5 |
|   | 155 | 64.4 | 56.2 | 83.2 | 100.4 | 55.9 |
|   | 130 | 65.3 | 54.0 | 76.2 | 93.4 | 54.7 |
|   | 105 | 67.3 | 51.4 | 65.6 | 83.3 | 51.9 |
|   | 80 | 70.8 | 44.6 | 49.5 | 66.7 | 48.0 |
|   | 55 | 74.2 | 36.1 | 35.9 | 50.9 | 44.9 |
|   | 30 | 80.1 | 23.5 | 18.6 | 30.0 | 38.3 |
|   | 15 | 86.0 | 13.2 | 8.1 | 15.4 | 31.6 |
| K | 255 | 2.7 | −0.2 | −0.3 | 0.3 | 234.2 |
|   | 230 | 3.4 | −0.2 | 0.3 | 0.3 | 116.6 |
|   | 205 | 5.0 | −0.2 | 1.8 | 1.8 | 97.2 |
|   | 180 | 10.1 | −0.3 | 5.3 | 5.3 | 93.4 |
|   | 155 | 18.8 | −0.7 | 7.0 | 7.0 | 95.6 |
|   | 130 | 29.3 | −0.5 | 8.1 | 8.1 | 93.5 |
|   | 105 | 41.4 | −0.9 | 7.7 | 7.7 | 96.5 |
|   | 80 | 53.1 | −1.1 | 5.3 | 5.4 | 101.9 |
|   | 55 | 66.6 | −0.9 | 2.4 | 2.6 | 109.5 |
|   | 30 | 78.8 | −0.5 | 0.1 | 0.5 | 174.1 |
|   | 15 | 86.3 | −0.2 | −1.4 | 1.4 | 261.1 |

The results for Comparative Example 2 are given in Tables 7 and 8.

TABLE 7

|   | Duty | L* | a* | b* | C* | h |
|---|---|---|---|---|---|---|
| Y | 255 | 88.2 | −1.3 | 108.9 | 108.9 | 90.7 |
|   | 230 | 88.5 | −2.1 | 108.6 | 108.6 | 91.1 |
|   | 205 | 88.7 | −3.1 | 108.3 | 108.4 | 91.6 |
|   | 180 | 88.9 | −4.3 | 107.7 | 107.8 | 92.3 |
|   | 155 | 89.2 | −6.0 | 106.6 | 106.7 | 93.2 |
|   | 130 | 89.7 | −7.3 | 104.7 | 105.0 | 94.0 |
|   | 105 | 90.0 | −9.2 | 99.5 | 100.0 | 95.3 |
|   | 80 | 91.1 | −9.9 | 87.9 | 88.4 | 96.4 |
|   | 55 | 92.0 | −10.6 | 63.8 | 64.7 | 99.4 |
|   | 30 | 93.3 | −8.2 | 35.2 | 36.1 | 103.2 |
|   | 15 | 94.0 | −5.0 | 15.8 | 16.6 | 107.5 |
| M | 255 | 52.5 | 80.6 | 1.7 | 80.6 | 1.2 |
|   | 230 | 53.6 | 79.8 | −1.6 | 79.8 | 358.9 |
|   | 205 | 55.2 | 77.7 | −6.4 | 78.0 | 355.3 |
|   | 180 | 58.2 | 74.4 | −10.0 | 75.0 | 352.3 |
|   | 155 | 61.0 | 68.1 | −14.1 | 69.6 | 348.3 |
|   | 130 | 66.2 | 59.6 | −14.0 | 61.2 | 346.8 |
|   | 105 | 71.4 | 47.7 | −15.1 | 50.0 | 342.5 |
|   | 80 | 76.1 | 36.0 | −14.2 | 38.7 | 338.5 |
|   | 55 | 82.2 | 24.5 | −11.0 | 26.8 | 335.7 |
|   | 30 | 87.8 | 14.0 | −7.8 | 16.0 | 330.7 |
|   | 15 | 91.7 | 6.9 | −6.0 | 9.2 | 319.1 |
| C | 255 | 48.8 | −32.6 | −65.4 | 73.1 | 243.5 |
|   | 230 | 50.6 | −35.6 | −63.8 | 73.1 | 240.8 |
|   | 205 | 53.2 | −39.5 | −61.4 | 73.0 | 237.2 |
|   | 180 | 56.1 | −41.9 | −58.6 | 72.0 | 234.4 |
|   | 155 | 60.4 | −45.6 | −52.2 | 69.3 | 228.9 |
|   | 130 | 65.1 | −43.4 | −47.5 | 64.3 | 227.6 |
|   | 105 | 69.3 | −37.3 | −41.2 | 55.6 | 227.8 |
|   | 80 | 74.5 | −30.0 | −33.6 | 45.0 | 228.2 |
|   | 55 | 81.1 | −21.0 | −24.8 | 32.5 | 229.7 |
|   | 30 | 87.3 | −12.3 | −15.9 | 20.1 | 232.3 |
|   | 15 | 91.2 | −6.6 | −10.0 | 12.0 | 236.8 |

TABLE 8

|   | Duty | L* | a* | b* | C* | h |
|---|---|---|---|---|---|---|
| R | 255 | 41.7 | 77.9 | 44.7 | 89.8 | 29.8 |
|   | 230 | 42.8 | 77.7 | 38.2 | 86.5 | 26.2 |
|   | 205 | 44.5 | 77.0 | 30.3 | 82.8 | 21.5 |
|   | 180 | 46.8 | 74.7 | 21.1 | 77.6 | 15.8 |
|   | 155 | 50.5 | 69.9 | 12.1 | 70.9 | 9.8 |
|   | 130 | 55.5 | 61.7 | 4.6 | 61.9 | 4.3 |
|   | 105 | 62.7 | 50.5 | −0.1 | 50.5 | 359.9 |
|   | 80 | 70.1 | 36.7 | −4.0 | 37.0 | 353.8 |
|   | 55 | 78.1 | 23.9 | −4.9 | 24.3 | 348.5 |
|   | 30 | 85.6 | 13.2 | −4.8 | 14.0 | 340.0 |
|   | 15 | 90.3 | 6.6 | −4.4 | 7.9 | 326.0 |
| V | 255 | 14.2 | 35.3 | −46.0 | 58.0 | 307.5 |
|   | 230 | 14.9 | 41.6 | −53.0 | 67.4 | 308.1 |
|   | 205 | 16.0 | 47.8 | −59.7 | 76.5 | 308.6 |
|   | 180 | 18.4 | 53.4 | −65.6 | 84.6 | 309.1 |
|   | 155 | 22.2 | 57.1 | −69.7 | 90.1 | 309.4 |
|   | 130 | 28.4 | 57.6 | −69.8 | 90.5 | 309.5 |
|   | 105 | 38.3 | 52.3 | −63.8 | 82.5 | 309.3 |
|   | 80 | 50.4 | 41.7 | −52.6 | 67.1 | 308.4 |
|   | 55 | 64.5 | 28.1 | −37.8 | 47.1 | 306.7 |
|   | 30 | 77.9 | 15.6 | −23.4 | 28.2 | 303.7 |
|   | 15 | 86.5 | 7.7 | −14.0 | 16.0 | 298.7 |
| K | 255 | 2.7 | −0.2 | −0.3 | 0.3 | 234.2 |
|   | 230 | 3.4 | −0.2 | 0.3 | 0.3 | 116.6 |
|   | 205 | 5.0 | −0.2 | 1.8 | 1.8 | 97.2 |
|   | 180 | 10.1 | −0.3 | 5.3 | 5.3 | 93.4 |
|   | 155 | 18.8 | −0.7 | 7.0 | 7.0 | 95.6 |
|   | 130 | 29.3 | −0.5 | 8.1 | 8.1 | 93.5 |
|   | 105 | 41.4 | −0.9 | 7.7 | 7.7 | 96.5 |
|   | 80 | 53.1 | −1.1 | 5.3 | 5.4 | 101.9 |
|   | 55 | 66.6 | −0.9 | 2.4 | 2.6 | 109.5 |
|   | 30 | 78.8 | −0.5 | 0.1 | 0.5 | 174.1 |
|   | 15 | 86.3 | −0.2 | −1.4 | 1.4 | 261.1 |

FIGS. 2 to 6 and 8 to 10 show graphs of the data in Tables 1 to 8.

Figure 2:
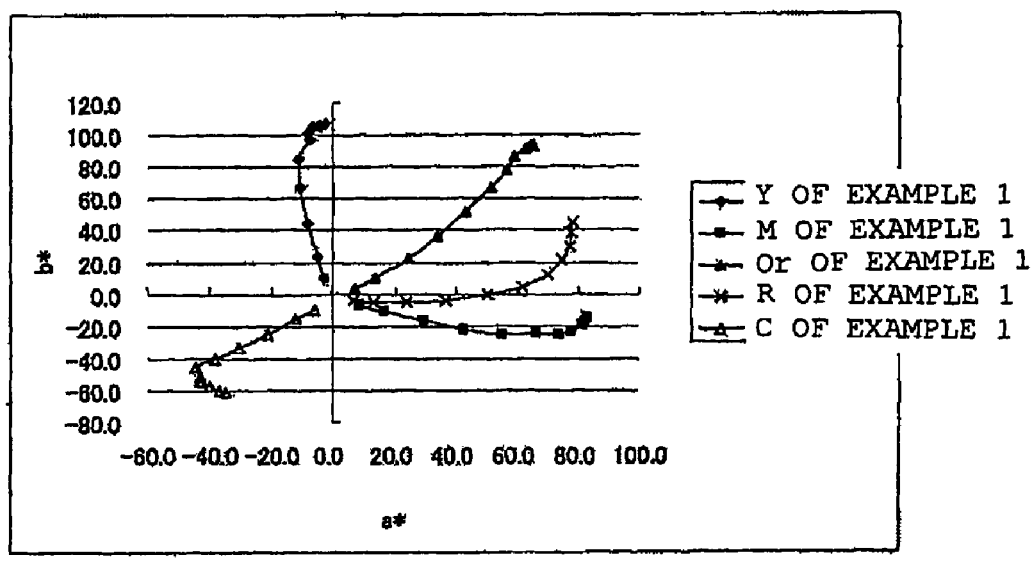
FIG. 2 is a graph of the relationship between the a* and b* values of a product printed using the ink set of Example 1.

FIG. 2 is a graph showing the relation between the a* and b* values of products printed using the ink set of Example 1. FIG. 2 shows that the orange ink and cyan ink of Example 1 were almost exactly the opposite hues.

Figure 8:
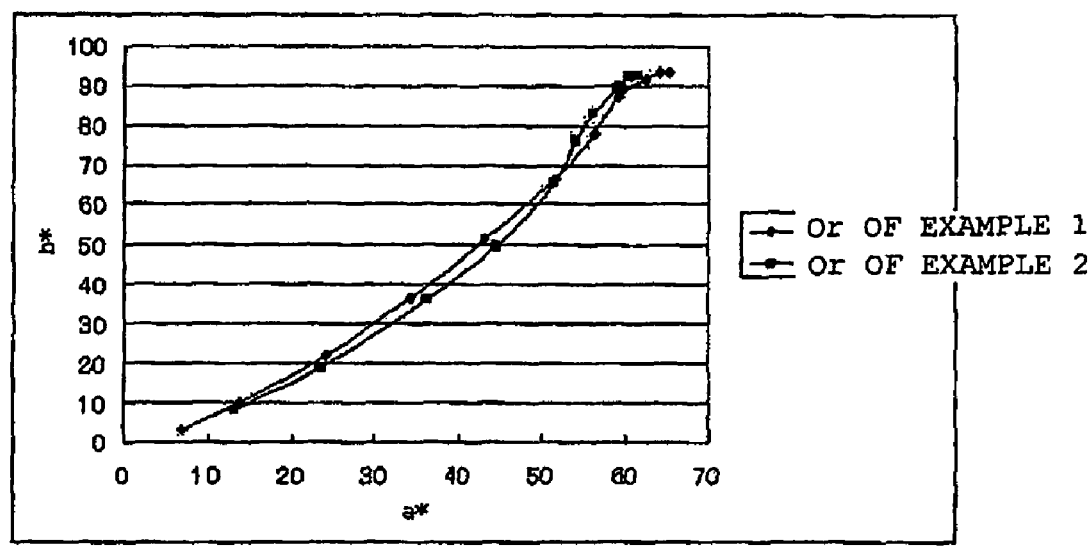
FIG. 8 is a graph of the relationship between the a* and b* values of a printed product relating to the orange ink composition of Example 1 and the orange ink composition of Example 2.

FIG. 8 is a graph showing the relation between the a* and b* values of products printed using the orange ink of Example 1 and the orange ink of Example 2. FIG. 8 shows there were no major differences between the hues of the orange ink of Example 1 and the orange ink of Example 2.

Figure 3:
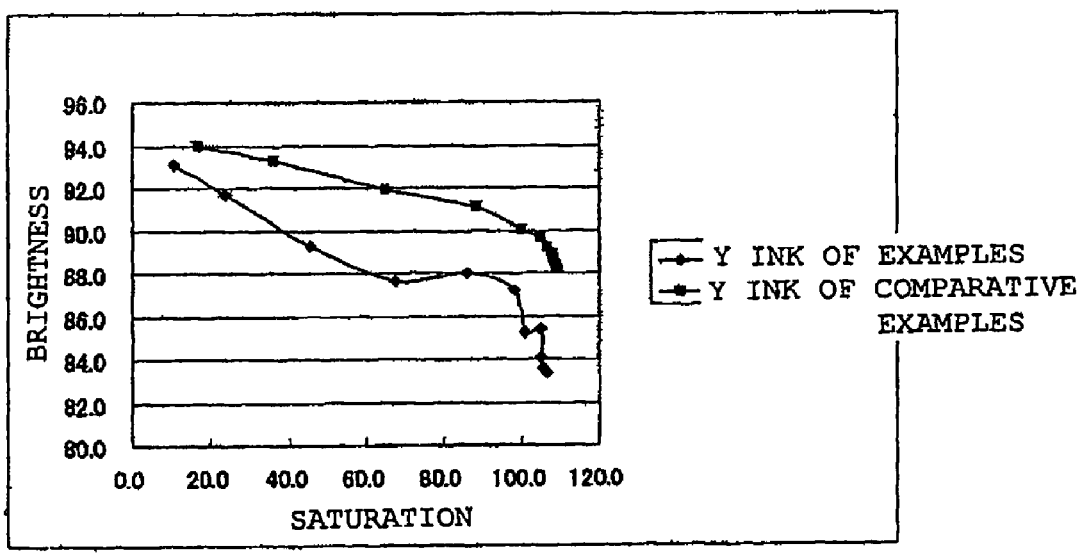
FIG. 3 is a graph of the relationship between the saturation and brightness of a product printed using the yellow ink of Example 1 and Comparative Example 1.

FIG. 3 is a graph showing the relation between saturation and brightness of products printed using the yellow inks of Example 1 and Comparative Example 1. FIG. 3 shows that the yellow ink of Example 1 had lower brightness at the same saturation than the yellow ink of Comparative Example 1.

Figure 4:
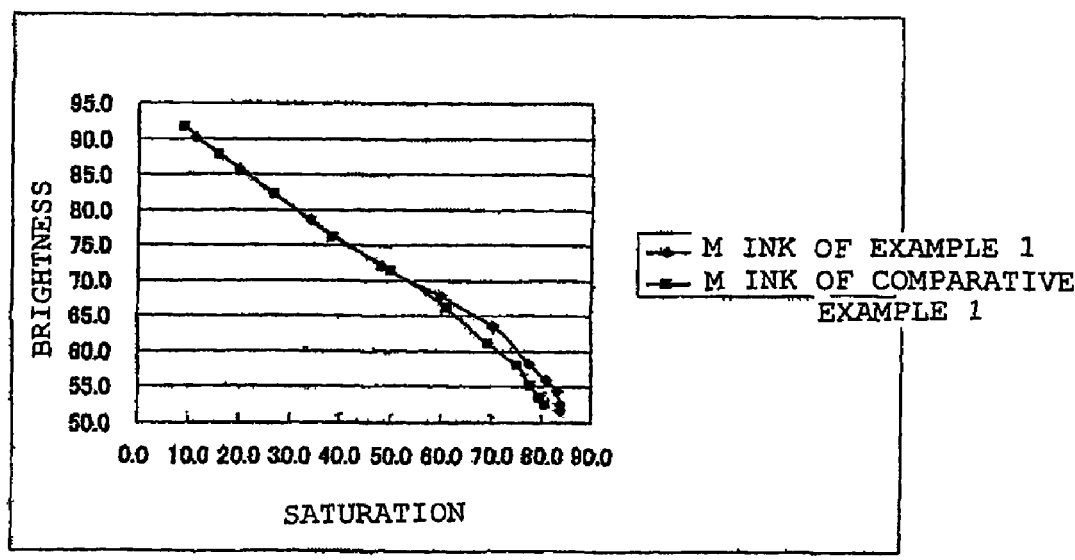
FIG. 4 is a graph of the relationship between the saturation and brightness of a product printed using the magenta ink of Example 1 and Comparative Example 1.

FIG. 4 is a graph showing the relation between saturation and brightness of products printed using the magenta inks of Example 1 and Comparative Example 1. FIG. 4 shows that the magenta ink of Example 1 had higher saturation at the same brightness than the magenta ink of Comparative Example 1.

Figure 5:
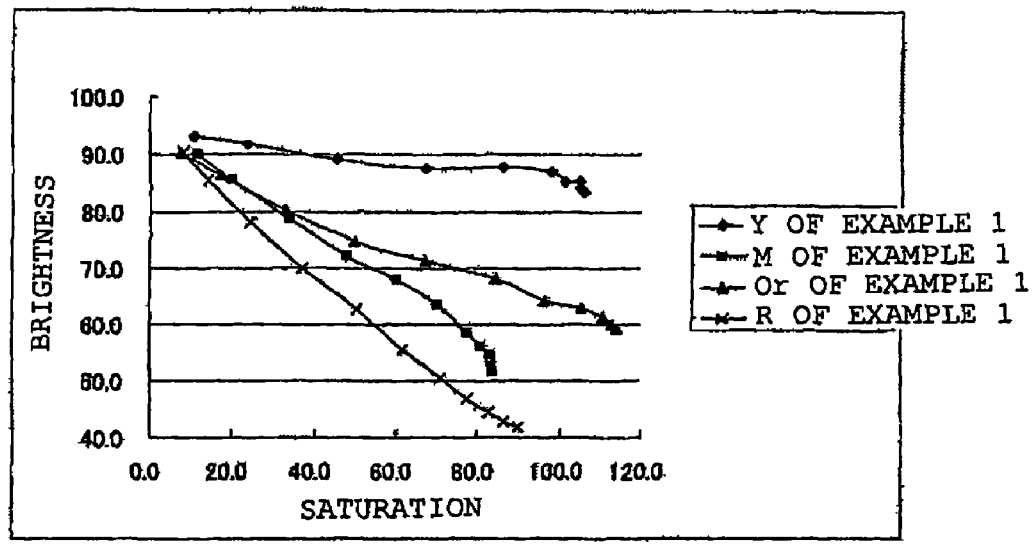
FIG. 5 is a graph of the relationship between the saturation and brightness of a product relating to Example 1.

FIG. 5 is a graph showing the relation between saturation and brightness of a printed product relating to Example 1. FIG. 5 shows that the orange ink of Example 1 had higher brightness at the same saturation than the magenta ink. The orange ink also had lower brightness at the same saturation than the yellow ink. The red ink had lower brightness at the same saturation than the magenta ink.

Figure 9:
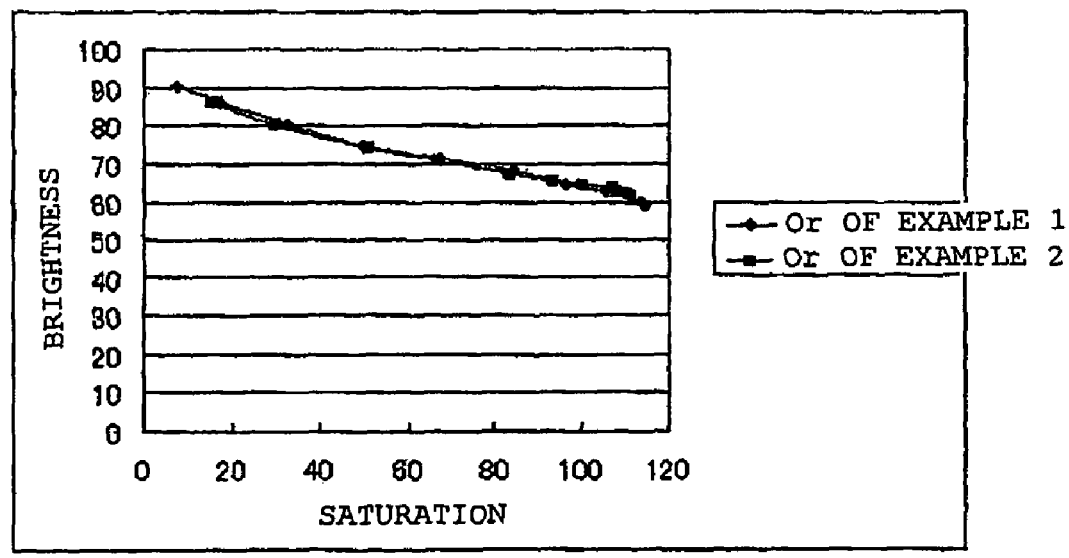
FIG. 9 is a graph of the relationship between the saturation and brightness of a printed product relating to the orange ink composition of Example 1 and the orange ink composition of Example 2.

FIG. 9 is a graph showing the relation between the saturation and brightness of a product printed using the orange ink of Example 1 and the orange ink of Example 2. FIG. 9 shows there were no major differences between the hues of the orange ink of Example 1 and the orange ink of Example 2.

Figure 6:
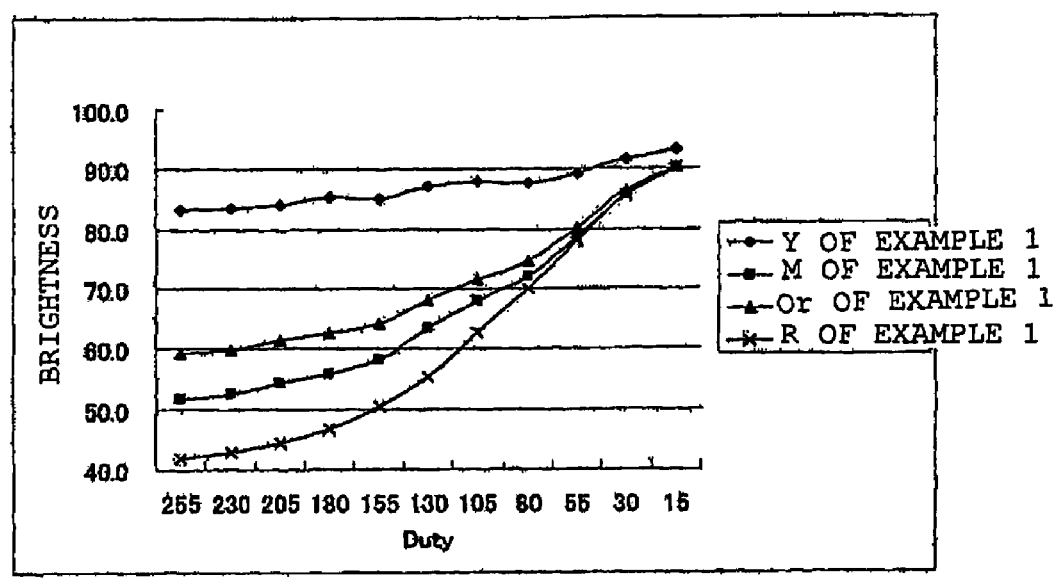
FIG. 6 is a graph of the relationship between the Duty and brightness of a product relating to Example 1.

FIG. 6 is a graph showing the relation between Duty and brightness of a printed product relating to Example 1. FIG. 6 shows that the orange ink of Example 1 had higher brightness than the magenta ink when adhering in the same amounts. The orange ink also had lower brightness than the yellow ink when adhering in the same amounts. The red ink had lower brightness than the magenta ink when adhering in the same amounts.

Figure 10:
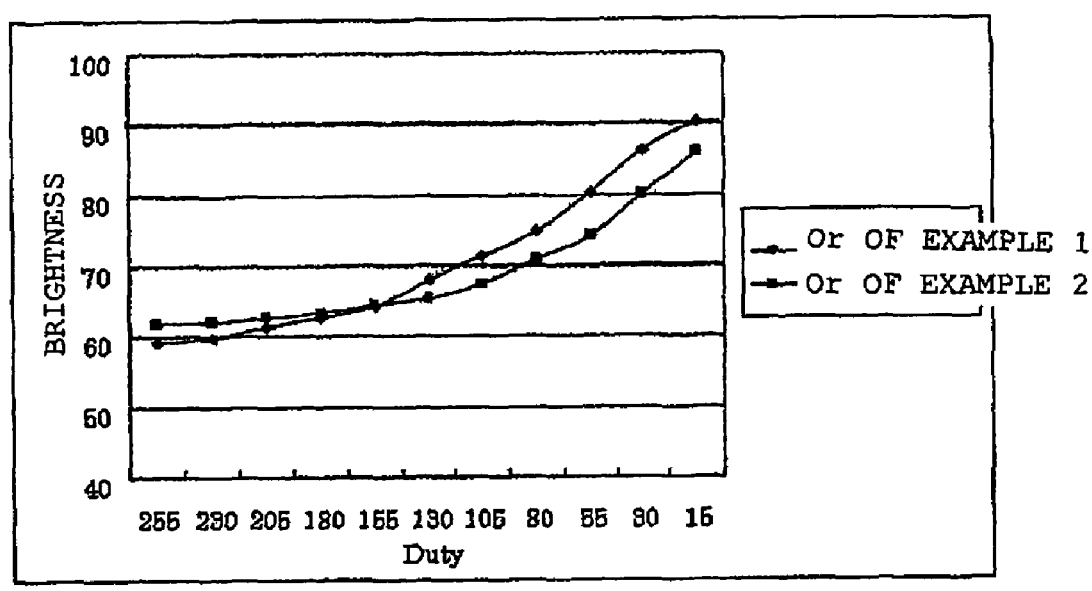
FIG. 10 is a graph of the relationship between the Duty and brightness of a printed product relating to the orange ink composition of Example 1 and the orange ink composition of Example 2.

FIG. 10 is a graph showing the relation between Duty and brightness of a product printed using the orange ink of Example 1 and the orange ink of Example 2. FIG. 10 shows that there were no major differences between the brightness of the orange ink of Example 1 and the orange ink of Example 2 when adhering in the same amounts.

The granularity, false contours, rainbow effect, and color reproducibility were also evaluated.

Evaluation of Granularity

PX-G900 was filled with the ink set of an example or a comparative example, and LUTs were produced at the same ink weight limit. The "JIS N1 Glass and Female" image and images of 40 randomly selected babies were then printed at 14440×720 dpi and 720×720 dpi on "Gloss" photographic paper, and the granularity of the skin was assessed.

A: No significant change in granularity from 14440×720 dpi to 720×720 dpi, and not particularly noticeable at 720×720 dpi.

B: Significant change in granularity from 14440×720 dpi to 720×720 dpi, and noticeable at 720×720 dpi.

Evaluation of Rainbow Effect

PX-G900 was filled with the ink set of an example or a comparative example, and LUTs were produced at the same ink weight limit. The "JIS N1 Glass and Female" image and images of 40 randomly selected babies were then printed at 14440×1440 dpi on "Gloss" photographic paper, and the images were assessed from various angles, with an F11 light source at a distance of 10 cm or 50 cm from the printed product.

A: Not much green color or red light at 10 cm, and complete absence of green color or red light at 50 cm.

B: Conspicuous green color or red light at 10 cm, and noticeable green color or red light at 50 cm.

Evaluation of False Contours

PX-G900 was filled with the ink set of an example or a comparative example, and LUTs were produced at the same ink weight limit. 40 randomly selected images of sunrise and sunset were then printed at 14440×1440 dpi on "Gloss" photographic paper, and the tone of the sun contour from yellow to red was assessed.

A: Sun reproduced with good tone.

B: Print showed sun with separate yellow and red rings; reproduced without good tone.

Evaluation of Color Reproducibility (Gamut Volume)

PX-G900 was filled with the ink set of an example or a comparative example, and LUTs were produced at the same ink weight limit. Images in which the maximum color reproducibility could be determined were then printed at 14440×720 dpi on "Gloss" photographic paper, and, giving printed products.

The gamut volume was calculated, where the gamut volume was 1 when the $L^*$, $a^*$, and $b^*$ values stipulated by CIE were all 1, based on the $L^*$, $a^*$, and $b^*$ values obtained through the above measurement. Evaluation was based on the following.

A: gamut volume≧750,000

B: gamut volume<750,000

The results are given in Table 9.

TABLE 9

| | Example 1 | Example 2 | Comp. Ex. 1 | Comp. Ex. 2 |
|---|---|---|---|---|
| granularity | A | A | B | B |
| false contours | A | A | B | B |
| rainbow effect | A | A | B | B |
| gamut volume | A | A | B | B |

Table 9 shows that the ink sets of Examples 1 and 2 had resulted in satisfactorily controlled granularity, controlled false contours, controlled rainbow effect, and color reproducibility.

Figure 7:
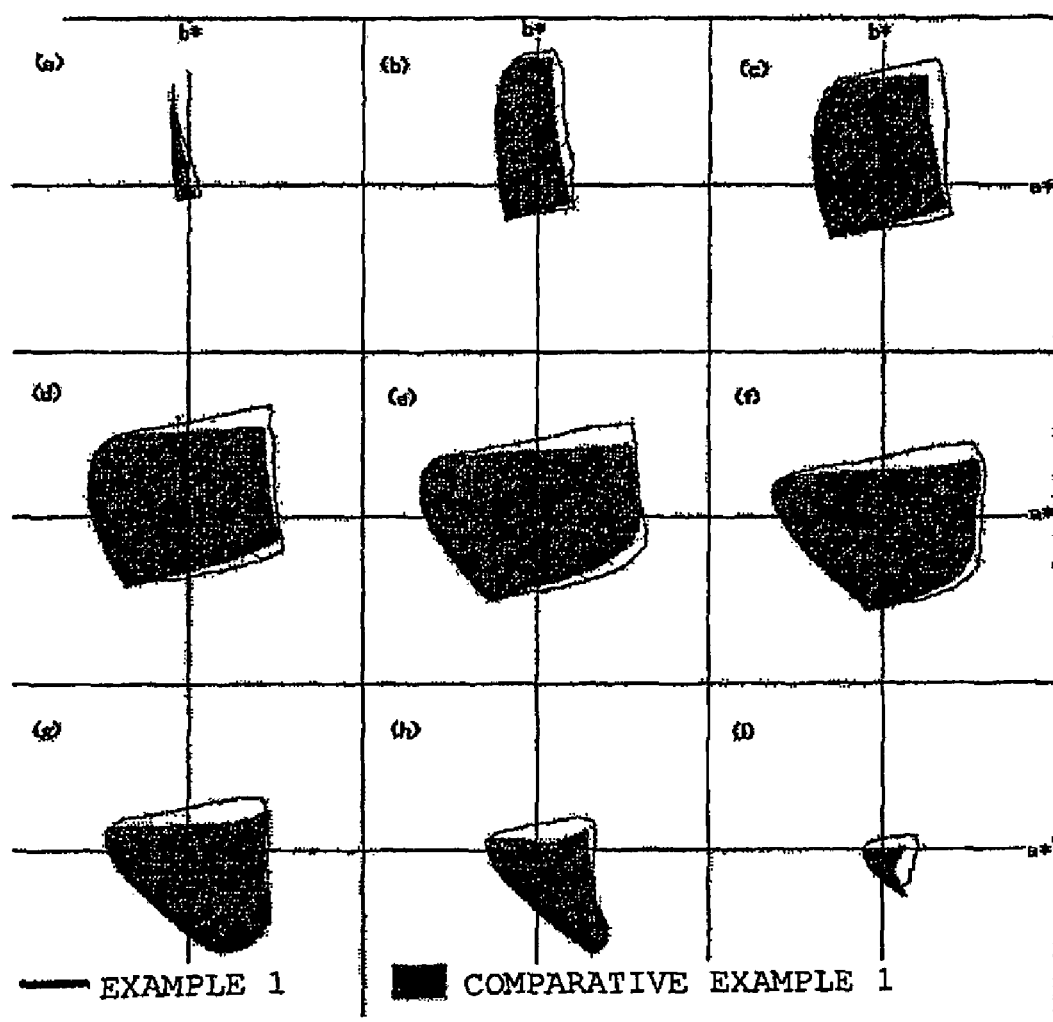
FIG. 7 compares the color reproduction area of the path pattern for the ink sets of Example 1 and Comparative Example 1.

The patch patterns of the ink sets of Example 1 and Comparative Example 1 are shown in FIG. 7A to I, and the patch patterns of the ink sets of Example 2 and Comparative Example 2 are shown in FIG. 11A to I. FIGS. 7A and 11A compare the color reproduction area at a high brightness ($L^*$=90), B compare color reproduction area at a high brightness ($L^*$=80), C compare color reproduction area at a high brightness ($L^*$=70), D compare color reproduction area at an intermediate brightness ($L^*$=60), E compare color reproduction area at an intermediate brightness ($L^*$=50), F compare color reproduction area at an intermediate brightness ($L^*$=40), G compare color reproduction area at a low brightness ($L^*$=30), H compare color reproduction area at a low brightness ($L^*$=20), and I compare color reproduction area at a low brightness ($L^*$=10).

The ink sets of Examples 1 and 2 were better than the ink sets of Comparative Examples 1 and 2 in the following respects.

(1) Green cast from superimposed dots can be controlled because the Y ink has low brightness, and because a lower amount of cyan ink can be used to lower the brightness in skin color.

(2) False contours can be controlled because of the high saturation of magenta ink and because of the ability to control orange ink or red ink.

(3) Because the cyan ink includes titanium dioxide, the red light of interference colors can be controlled, which in concert with the effects of (1) allows the rainbow effect to be controlled.

(4) Granularity will not deteriorate despite the active generation of orange ink because the orange ink has higher brightness and higher saturation than the magenta ink and higher saturation and lower brightness than the yellow ink. The orange ink can thus be used instead of yellow ink to effectively reduce the incidence of superimposed cyan ink dots and yellow ink dots, and to control green cast. Furthermore, because the difference in the hue angle of orange ink relative to the cyan ink is about 180 degrees, the brightness can be effectively lowered without green cast when cyan ink is generated.

(5) The red ink has higher saturation and lower brightness than the magenta ink but the yellow ink has a low brightness, thus preventing the deterioration of granularity, and/or the magenta ink has high saturation and/or the orange ink has high saturation, allowing red ink to be generated while controlling false contours, so that the brightness can be lowered with these hues in skin color.

Figure 11:
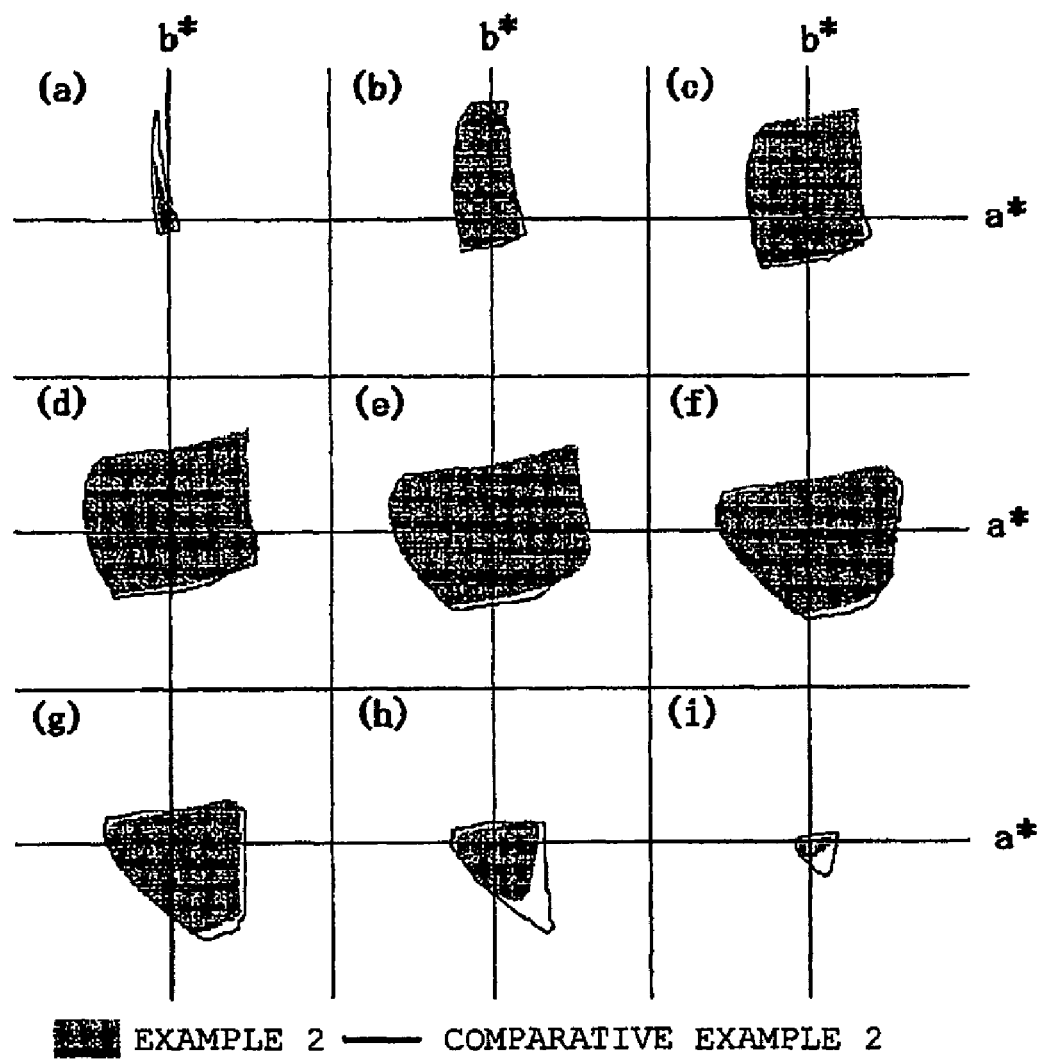
FIG. 11 compares the color reproduction area of the patch patterns for Example 2 and Comparative Example 2.

(6) As illustrated in FIG. 11, the color reproducibility of blue in dark areas was good in Comparative Example 2 (fine lines), but the color reproducibility of yellow in dark areas was poor. There is thus a possibility that false contours will tend to be produced from high to low brightness. By contrast, there is no such problem in Example 2 (smears).

Example 3

Cyan ink (2) was prepared using the following formulation.

| Cyan Ink Composition (2) | |
| --- | --- |
| PB 15:3 | 1.5 wt % |
| titanium dioxide | 0.5 wt % |
| styrene-acrylic acid copolymer resin | 0.8 wt % |
| glycerin | 10.0 wt % |
| 4-methyl-1,2-pentane diol | 8.0 wt % |
| triethanolamine | 0.9 wt % |
| BYKUV 3510 (BYK-Chemie) | 0.1 wt % |
| purified water | balance |
| Total | 100.0 wt % |

Printing was done in the same manner as Example 1, and the L*, a*, and b* values of the cyan ink composition (2) were determined. The results are given in Table 10.

TABLE 10

| Duty | L* | a* | b* |
| --- | --- | --- | --- |
| 255 | 47.81 | −31.27 | −63.14 |
| 230 | 49.74 | −34.94 | −61.35 |
| 205 | 52.16 | −38.23 | −59.52 |
| 180 | 55.35 | −41.23 | −55.98 |
| 155 | 59.6 | −44.87 | −50.31 |
| 130 | 63.68 | −42.75 | −46.39 |
| 105 | 68.53 | −36.12 | −39.69 |
| 80 | 73.67 | −28.96 | −32.02 |
| 55 | 80.54 | −19.59 | −22.69 |
| 30 | 85.67 | −12.48 | −15.58 |
| 15 | 89.68 | −6.8 | −9.8 |

The ink set of Example 3 was obtained in the same manner as in Example 1 except for the use of the cyan ink composition (2) instead of the cyan ink composition (1).

Figure 12:
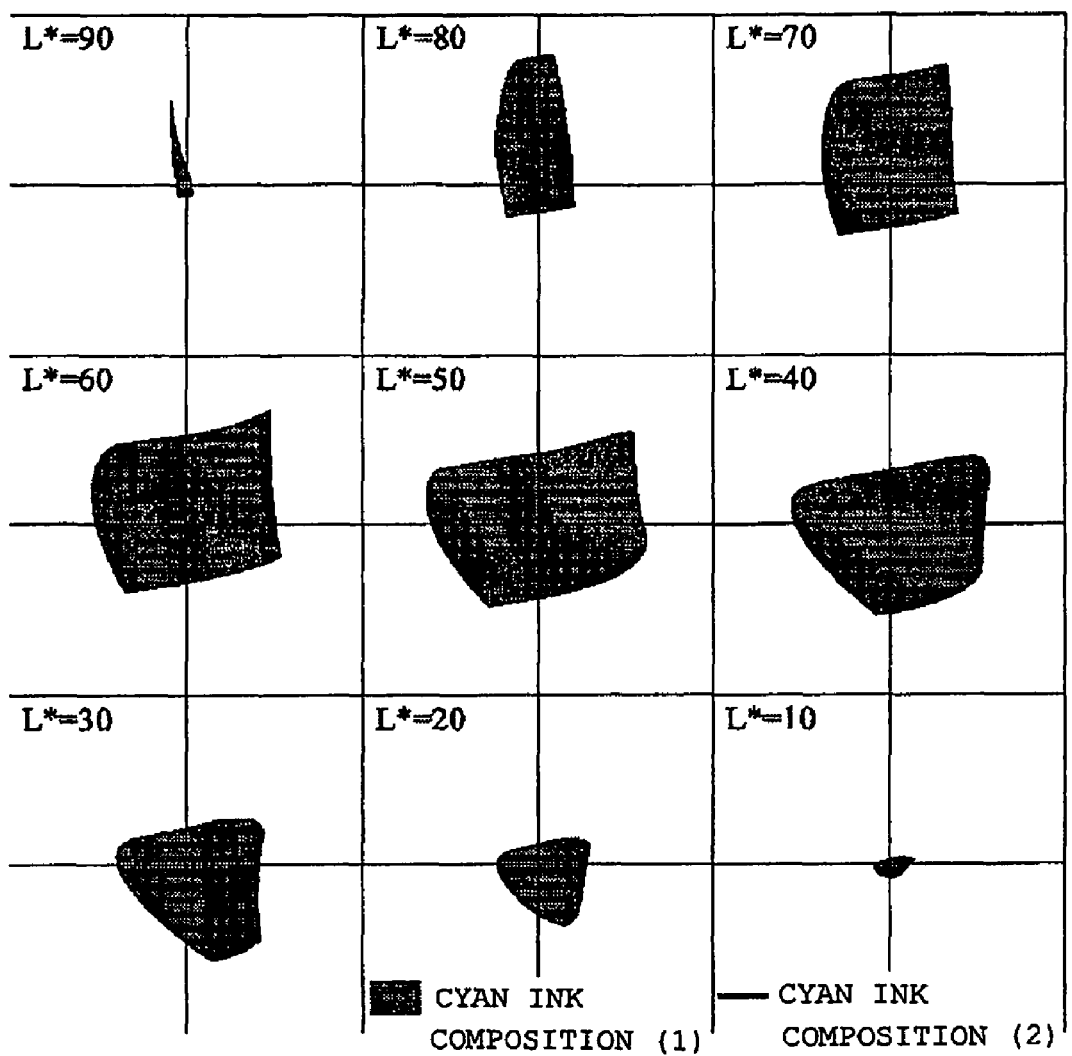
FIG. 12 compares the color reproduction area of the patch patterns for Example 1 and Example 3.

The path patterns of the ink sets of Examples 1 and 3 are given in FIG. 12.

FIG. 12 shows that the ink set of Example 3 was as good as the ink set of Example 1.

What is claimed is:

1. An ink set comprising at least three colors of inks: yellow ink with a hue angle ∠H°, as defined in CIELAB color space on a recording medium, in the range of about 80° to about 110°; magenta ink with a hue angle ∠H° in the range of about 330° to about 360°; cyan ink with a hue angle ∠H° in the range of about 230° to about 260°; and the following ink (A) and ink (B), ink (A): ink with a hue angle ∠H° in the range of about 0° to about 80°; and ink (B): ink with a hue angle ∠H° in the range of about 0° to about 80°, wherein the ink (A) has higher saturation and lower brightness than the magenta ink, and the ink (B) has higher saturation and higher brightness than the magenta ink and higher saturation and lower brightness than the yellow ink, and the hue angle (∠H°) is determined as hue angle ∠H°=tan$^{-1}$(b*/a*)+180 when a*<0 or ∠H°=tan$^{-1}$(b*/a*)+360 when a*>0, a* and b* representing the perceived chromaticity index as defined in CIELAB color space.

2. The ink set according to claim 1, wherein the yellow ink and cyan ink comprise complex pigments.

3. The ink set according to claim 1, wherein the yellow ink comprises C.I. Pigment Yellow 74 and C.I. Pigment Yellow 129 as pigments, and the cyan ink comprises one or two pigments selected from the group of C.I. Pigment Blue 15:4 and C.I. Pigment Blue 15:3.

4. The ink set according to claim 1, wherein the cyan ink comprises white pigment.

5. The ink set according to claim 1, wherein the magenta ink comprises γ-type C.I. Pigment Violet 19 and C.I. Pigment Red 202 solid solution as pigment.

6. The ink set according to claim 1, wherein the ink (A) is red ink.

7. The ink set according to claim 1, wherein the ink (A) is red ink comprising C.I. Pigment Red 177 and/or C.I. Pigment Red 179 as pigment.

8. The ink set according to claim 1, wherein the ink (B) is orange ink.

9. The ink set according to claim 1, wherein the ink (B) is orange ink comprising C.I. Pigment Orange 43 and/or C.I. Pigment Red 242 as pigment.

10. The ink set according to claim 1, wherein the mixing ratio of C.I. Pigment Orange 43 to C.I. Pigment Red 242 in the ink (B) is 4:1 to 2:1.

11. The ink set according to claim 1, further comprising blue ink containing C.I. Pigment Blue 15:1 and/or C.I. Pigment Violet 23 as pigment.

12. The ink set according to claim 1, wherein the pigment solids concentration in the inks is less than 3 wt %.

13. The ink set according to claim 1, further comprising black ink, the black ink comprising C.I. Pigment Black 7 as pigment.

14. The ink set according to claim 1, further comprising black ink, the black pigment solids concentration being no more than 1 wt %.

15. The ink set according to claim 1, further comprising clear ink.

16. The ink set according to claim 1, comprising at least 3 wt % and no more than 15 wt % $C_5$ to $C_{10}$ alkanediol that may have branches.

17. The ink set according to claim 1, comprising a polyorganosiloxane as surfactant.

18. The ink set according to claim 1, comprising a polyorganosiloxane represented by the following general formula as surfactant:

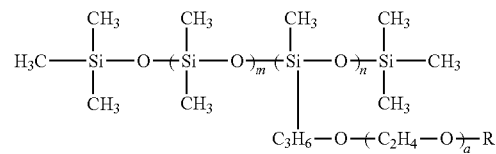

wherein R is a hydrogen atom or methyl group, a is an integer of 7 to 11, m is an integer of 20 to 70, and n is an integer of 2 to 5.

19. The ink set according to claim 18, further comprising a polyorganosiloxane represented by the following general formula as surfactant:

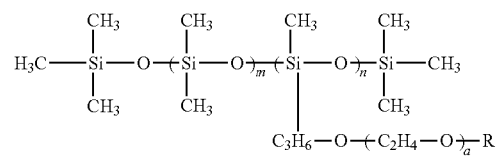

wherein R is a hydrogen atom or methyl group, a is an integer of to 13, m is an integer of 2 to 4, and n is an integer of 1 to 2.

* * * * *